(12) United States Patent
Nakamura

(10) Patent No.: US 10,758,318 B2
(45) Date of Patent: Sep. 1, 2020

(54) ELECTRIC MOTOR AND DENTAL DEVICE

(71) Applicant: NAKANISHI INC., Tochigi (JP)

(72) Inventor: Akito Nakamura, Tochigi (JP)

(73) Assignee: NAKANISHI INC., Tochigi (JP)

( * ) Notice: Subject to any disclaimer, the term of this patent is extended or adjusted under 35 U.S.C. 154(b) by 765 days.

(21) Appl. No.: 15/500,310

(22) PCT Filed: Jul. 30, 2015

(86) PCT No.: PCT/JP2015/003855
§ 371 (c)(1),
(2) Date: Jan. 30, 2017

(87) PCT Pub. No.: WO2016/017180
PCT Pub. Date: Feb. 4, 2016

(65) Prior Publication Data
US 2017/0215991 A1 Aug. 3, 2017

(30) Foreign Application Priority Data

Jul. 31, 2014 (JP) .................................. 2014-156111

(51) Int. Cl.
*A61C 1/06* (2006.01)
*A61C 1/02* (2006.01)
(Continued)

(52) U.S. Cl.
CPC .............. *A61C 1/06* (2013.01); *A61C 1/003* (2013.01); *A61C 1/0061* (2013.01); *A61C 1/02* (2013.01);
(Continued)

(58) Field of Classification Search
CPC ......... A61C 1/003; A61C 1/0061; A61C 1/02; A61C 1/06; A61C 1/088; H02K 21/12;
(Continued)

(56) References Cited

U.S. PATENT DOCUMENTS 3,135,882 A * 6/1964 Mollenberg ............. H02K 9/14
310/57
3,243,617 A * 3/1966 Cunningham ........... H02K 9/06
310/63

(Continued)

FOREIGN PATENT DOCUMENTS

CN  1756039 A   4/2006
CN  202004615 U  10/2011
(Continued)

OTHER PUBLICATIONS

Office action and translation for JP2016-538159 dated Jun. 18, 2019.
(Continued)

*Primary Examiner* — Tulsidas C Patel
*Assistant Examiner* — Ahmed Elnakib
(74) *Attorney, Agent, or Firm* — Pearne & Gordon LLP

(57) ABSTRACT

Provided are an electric motor that enables to achieve downsizing while securing performance, and a dental device that includes the electric motor. A brushless slotless electric motor 10 includes: a stator 3 that includes a stator core 301 and a plurality of coils 31 to 33, the plurality of coils 31 to 33 being disposed at an inside of the stator core 301; and a rotor 2 that includes a shaft 21 and a magnet 22, the rotor 2 being rotated around the shaft 21 with respect to the stator 3. The plurality of coils 31 to 33 are adjacent to each other in a rotation direction of the rotor 2 so as not to lap mutually. Lf<Lc is satisfied where Lf is a length of the stator core 301 in an axial direction and Lc is a length of the coil in the axial direction.

9 Claims, 10 Drawing Sheets

(51) Int. Cl.

| | |
|---|---|
| *H02K 5/15* | (2006.01) |
| *H02K 29/03* | (2006.01) |
| *H02K 29/00* | (2006.01) |
| *A61C 1/00* | (2006.01) |
| *A61C 1/08* | (2006.01) |
| *H02K 21/12* | (2006.01) |
| *H02K 3/24* | (2006.01) |
| *H02K 1/27* | (2006.01) |
| *H02K 1/12* | (2006.01) |
| *H02K 3/47* | (2006.01) |

(52) U.S. Cl.
CPC .............. *A61C 1/088* (2013.01); *H02K 5/15* (2013.01); *H02K 21/12* (2013.01); *H02K 29/00* (2013.01); *H02K 29/03* (2013.01); *H02K 1/12* (2013.01); *H02K 1/278* (2013.01); *H02K 3/24* (2013.01); *H02K 3/47* (2013.01)

(58) Field of Classification Search
CPC .......... H02K 29/00; H02K 29/03; H02K 5/15; H02K 1/12; H02K 1/278; H02K 3/24; H02K 3/47
USPC .......................... 310/59, 50, 49, 52, 60 A, 58
See application file for complete search history.

(56) References Cited

U.S. PATENT DOCUMENTS

| | | | | |
|---|---|---|---|---|
| 5,304,883 | A | * | 4/1994 | Denk ................... H02K 1/12 174/DIG. 19 |
| 5,391,954 | A | * | 2/1995 | Takehara ................ H02K 1/02 310/216.002 |
| 5,538,423 | A | * | 7/1996 | Coss .................... A61C 1/0015 408/8 |
| 2004/0113506 | A1 | | 6/2004 | Okubo |
| 2009/0016027 | A1 | | 1/2009 | Lu |
| 2009/0160271 | A1 | | 6/2009 | Bischof et al. |
| 2009/0243424 | A1 | | 10/2009 | Watanabe |
| 2012/0001509 | A1 | | 1/2012 | Yamada et al. |
| 2012/0068557 | A1 | | 3/2012 | Duesing et al. |
| 2012/0153762 | A1 | * | 6/2012 | Tassinario ............... H02K 3/04 310/156.32 |
| 2013/0203014 | A1 | * | 8/2013 | Lieb ...................... A61C 1/185 433/131 |
| 2013/0307353 | A1 | * | 11/2013 | Maekawa .............. H02K 21/22 310/43 |
| 2013/0342050 | A1 | * | 12/2013 | Duesing .................. H02K 5/08 310/59 |
| 2014/0087329 | A1 | * | 3/2014 | Muto ........................ A61C 1/06 433/131 |
| 2014/0125180 | A1 | | 5/2014 | Thaler |

FOREIGN PATENT DOCUMENTS

| | | |
|---|---|---|
| DE | 10033577 A1 | 4/2001 |
| DE | 202004002527 U1 | 12/2004 |
| EP | 2597761 A2 | 5/2013 |
| EP | 2710977 A1 | 3/2014 |
| JP | 2002-209357 A | 7/2002 |
| JP | 2002-233126 A | 8/2002 |
| JP | 2002272049 A | 9/2002 |
| JP | 2005151719 A | 6/2005 |
| JP | 2007-274869 A | 10/2007 |
| JP | 2010051150 A | 3/2010 |
| JP | 2011-24365 A | 2/2011 |
| JP | 2011024365 A * | 2/2011 |
| JP | 2012-125088 A | 6/2012 |
| JP | 2012-130244 A | 7/2012 |
| JP | 2012-521185 A | 9/2012 |
| JP | 5248751 B2 | 4/2013 |
| JP | 2014-61222 A | 4/2014 |
| KR | 1020090050867 A | 1/2010 |

OTHER PUBLICATIONS

Office Action for European Application No. 15826678.3, dated Nov. 20, 2018.
Office Action for European Application No. 15826678.3, dated Jan. 4, 2019.
International Search Report for PCT/JP2015/003855 dated Oct. 13, 2015.
Extended European Search Report for Application No. EP15826678, dated Mar. 1, 2018.

* cited by examiner

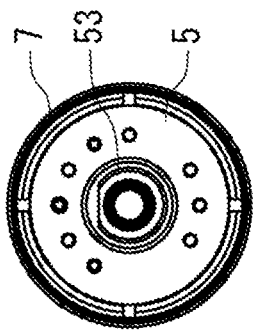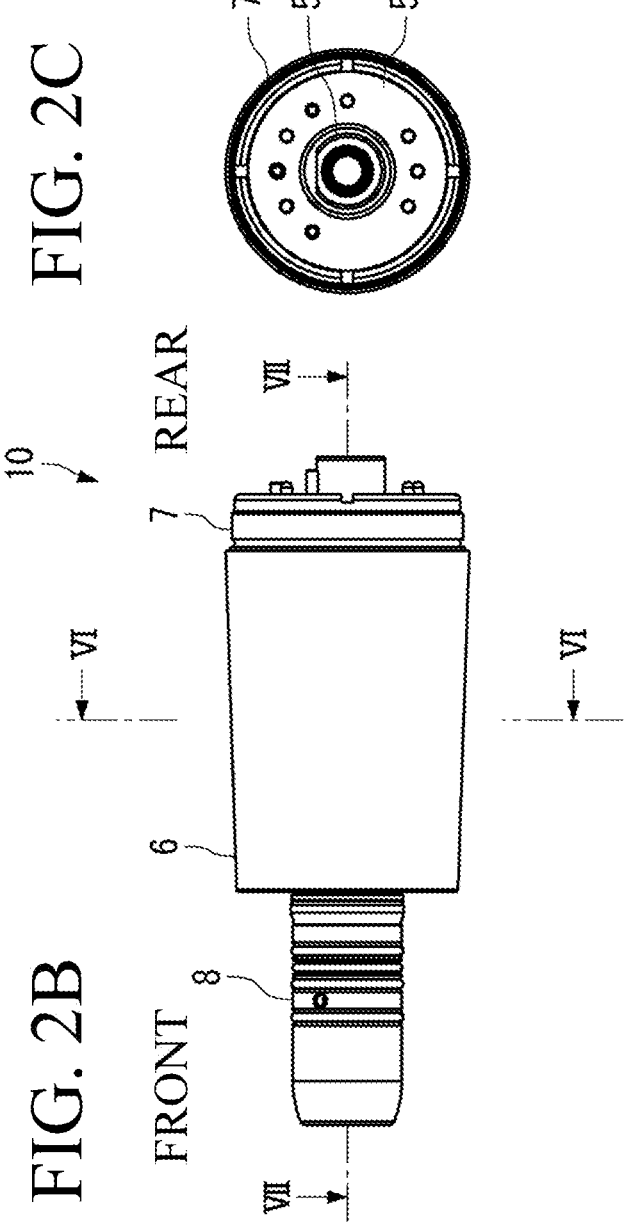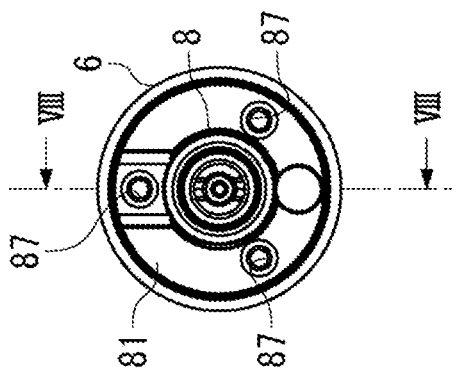

ELECTRIC MOTOR AND DENTAL DEVICE

TECHNICAL FIELD

The present invention relates to a small brushless slotless motor, for example, a motor that is applied to a dental handpiece, and a dental device.

BACKGROUND ART

As an electric motor, a brushless slotless motor is used, for the sake of the suppression of rotation unevenness and vibration (for example, Patent Literature 1).

A plurality of coils are disposed at the inner circumference of a cylindrical stator core of the motor, and a rotor in which a permanent magnet having the number of poles corresponding to the number of the coils is provided at the periphery of a shaft is disposed at the inner circumference of the coils.

CITATION LIST

Patent Literature

Patent Literature 1: Japanese Patent No. 5248751

SUMMARY OF INVENTION

Technical Problem

The stator coils, the stator core and the permanent magnet of the rotor, which are main elements to contribute to the drive of the above motor, are set such that the lengths as the sizes in the axial direction (hereinafter, sometimes referred to as merely the lengths) are equal to each other. Even if the lengths are different, the difference is in the range of tolerance (Patent Literature 1).

Here, in particular, a motor to drive a dental handpiece requires a downsizing that allows an operator to easily perform operation in hand, in addition to a sufficient torque output (performance) for stably performing the cutting and polishing with a tool.

The present invention has an object to provide an electric motor that enables to achieve the downsizing while securing the performance, and a dental device that includes the electric motor.

Solution to Problem

A brushless slotless electric motor according to the present invention includes: a stator that includes a stator core and a plurality of coils, the plurality of coils being disposed at an inside of the stator core; and a rotor that includes a shaft, the rotor being rotated around the shaft with respect to the stator, in which the plurality of coils are adjacent to each other in a rotation direction of the rotor so as not to lap mutually.

Then, the electric motor in the present invention is characterized in that a first requirement is satisfied, the first requirement being $Lf<Lc$ where $Lf$ is a length of the stator core in an axial direction and $Lc$ is a length of the coil in the axial direction.

In the specification, the rotation direction of the rotor is referred to as the "circumferential direction".

In the specification, unless otherwise mentioned, the "axial direction" of a certain matter is a direction identical to the axial direction of a shaft included in the rotor, or a direction parallel to the axial direction of the shaft.

Further, in the specification, the "radial direction" of a certain matter means an arbitrary direction orthogonal to the "axial direction".

According to the present invention, by $Lf<Lc$, an end portion of the stator core in the axial direction is offset so as to recede toward the center in the axial direction relative to an end portion of a coil end, and therefore, a space is produced at the outside of the coils by the offset quantity. According to the present invention, it is possible to dispose members constituting the electric motor or parts of the members in the space, and therefore, it is possible to downsize the electric motor by that quantity.

Here, in the coil of the electric motor in the present invention, a coil side that extends along the axial direction mainly contributes to the generation of torque, and the degree of the contribution of the coil end to the torque generation is low. Therefore, even in the case of $Lf<Lc$, that is, even when the end portion of the stator core that faces the coil end is offset, the performance of the motor does not greatly decrease.

Therefore, according to the present invention, it is possible to achieve the downsizing while securing the performance.

The coil in the present invention includes: a coil side that extends along the axial direction; and a coil end that is positioned at an end portion in the axial direction.

In the present invention, the length $Lf$ of the stator core can be determined such that $Lf \geq Lcs$ holds where $Lcs$ is a length of the coil side in the axial direction.

Thereby, the stator core exists over the whole of the coil side, at which the degree of the contribution to the torque generation is high, and the magnetic flux generated by the coil side can be sufficiently interlinked with the stator core. Therefore, it is possible to secure the output torque more sufficiently.

In the produced space in the present invention, it is possible to dispose various constituent members that are disposed near the stator core, or parts of the members, and as one of them, there is a fitting portion of a case.

That is, when the electric motor in the present invention includes: a case body including a storage space that stores the rotor and the stator, the case body having an opening formed at least at one end side in the axial direction, the opening leading to the storage space; and an end portion case including a fitting portion that is fitted to the case body through the opening, the fitting portion can be disposed in a first space that is formed because an end portion of the stator core recedes relative to an end portion of the coil end by the first requirement.

It is preferable that the electric motor in the present invention include a medium pathway through which a medium passes, the medium being used for actualizing a function of an application object of the electric motor, in which the medium pathway is disposed between the adjacent coils.

Here, examples of the "medium" in the present invention include a fluid such as water and air that is used for actualizing functions such as the cleaning and cooling of the application object, and an electric wire or light that is used for actualizing functions such as lighting and sensing. The "medium pathway" is a pathway (space) that is necessary for the passing of such a medium. For example, if the medium is a fluid, the "medium pathway" corresponds to a space occupied by a channel (a pipe or the like) through which the fluid passes, and if the medium is an electric wire or light, it corresponds to a space occupied by the electric wire or a light transmission member.

According to the present invention of the above configuration, it is possible to put the medium pathway in the gap between the adjacent coils, without giving a stress on the coils. Thereby, the medium pathway is embedded in the interior of a main element (the rotor and the stator) that performs the drive of the motor, and therefore, a space for disposing the medium pathway is not necessary, at the outside of the main element.

Therefore, it is possible to use the ineffective magnetic region that has been used for the medium pathway at the outside of the main element of the motor, for bringing out the motor output.

Thereby, it is possible to achieve the downsizing by reducing the diameter of a motor case while securing the outer diameter of the main element of the motor that is appropriate to a required output, and it is possible to achieve the performance enhancement by securing a larger outer diameter as the outer diameter of the main element while maintaining a small diameter as the diameter of the motor case.

In other words, it is possible to enhance the performance per the size of the motor case.

The medium pathway does not need to be disposed in all gaps respectively existing in the adjacent-coil intervals among the plurality of coils, and the medium pathway only needs to be disposed in at least one gap.

Further, a brushless slotless electric motor according to the present invention includes: a stator that includes a stator core and a plurality of coils, the plurality of coils being disposed at an inside of the stator core; and a rotor that includes a shaft and a permanent magnet, the rotor being rotated around the shaft with respect to the stator, in which the plurality of coils are adjacent to each other in a rotation direction of the rotor so as not to lap mutually.

Then, the electric motor in the present invention is characterized in that a second requirement is satisfied, the second requirement being $Lm<Lf$ where $Lf$ is a length of the stator core in an axial direction and $Lm$ is a length of the permanent magnet in the axial direction.

The second requirement in the present invention is common with the first requirement, in that a space is produced by shortening the length of a member constituting the main element of the motor, without a great decrease in the performance of the motor.

A bearing to support the shaft in a rotatable manner, a member to give preload to the bearing, and the like are disposed at the periphery of the shaft supporting the permanent magnet, and therefore, a space appropriate to them is necessary. The length necessary for the rotor including the space (hereinafter, referred to as the necessary length) is longer than the stator, resulting in the influence on the total length of the motor.

Hence, when the length $Lm$ of the permanent magnet is set so as to be shorter than the length $Lf$ of the stator core ($Lm<Lf$) as the second requirement in the present invention, the end portion of the permanent magnet recedes and is offset relative to the end portion of the stator core, and therefore, the space at the periphery of the shaft expands in the axial direction by that offset quantity. The necessary length of the rotor can be reduced by the quantity by which the space expands in the axial direction, and therefore, it is possible to downsize the electric motor in the axial direction.

Here, even in the case of $Lm<Lf$, the performance of the motor does not greatly decrease, compared to the case of $Lm\geq Lf$. In the case of $Lm\geq Lf$, the magnetic flux is likely to be saturated at the end portion of the stator core that faces the end portion of the permanent magnet, at which a strong magnetic flux is generated. Originally, in the case of $Lm\geq Lf$, the magnetic flux is likely to be concentrated and saturated at the end portion of the stator core, even when an even magnetic flux is generated over the whole length of the permanent magnet. When the magnetic flux leaked by the saturation of the magnetic flux flows into the motor case, eddy current is generated and heat is generated, resulting in the decrease in the efficiency and performance of the motor.

Meanwhile, when the second requirement in the present invention, that is, $Lm<Lf$ is met, the stator core can be disposed so as to face also the end portion of the permanent magnet, and the strong magnetic flux generated from the end portion of the permanent magnet can be dispersed to the range in which the stator core protrudes in the axial direction relative to the end surface of the permanent magnet. Thereby, the magnetic flux is unlikely to be saturated at the end portion of the stator core, and the leakage of the magnetic flux to the exterior is suppressed. Therefore, it is possible to suppress the decrease in the efficiency and performance due to the heat generation in the motor case.

Thus, when the position of the end portion of the permanent magnet is offset and $Lm<Lf$ is satisfied, it is possible to reduce the necessary length of the rotor and achieve the downsizing of the electric motor, by utilizing the produced space while securing a required performance.

It is preferable that the electric motor in the present invention have both of the first requirement and the second requirement. Thereby, it is possible to use the space in the motor case without waste and provide the most suitable packaging of the motor.

A dental device in the present invention includes: any electric motor described above; a dental handpiece that is driven by the electric motor; and a controller that performs drive control of the electric motor.

Advantageous Effects of Invention

According to the present invention, it is possible to provide an electric motor that enables to achieve the downsizing while securing the performance, and a dental device that includes the electric motor.

BRIEF DESCRIPTION OF DRAWINGS

FIGS. 2A to 2C show a dental motor according to the embodiment of the present invention, in which FIG. 2A is a diagram viewed from the front side, FIG. 2B is a lateral view and FIG. 2C is a diagram viewed from the rear side.

DESCRIPTION OF EMBODIMENTS

Hereinafter, an embodiment of the present invention will be described with reference to the accompanying drawings.

[Schematic Configuration of Device for Dentistry]

Figure 1:
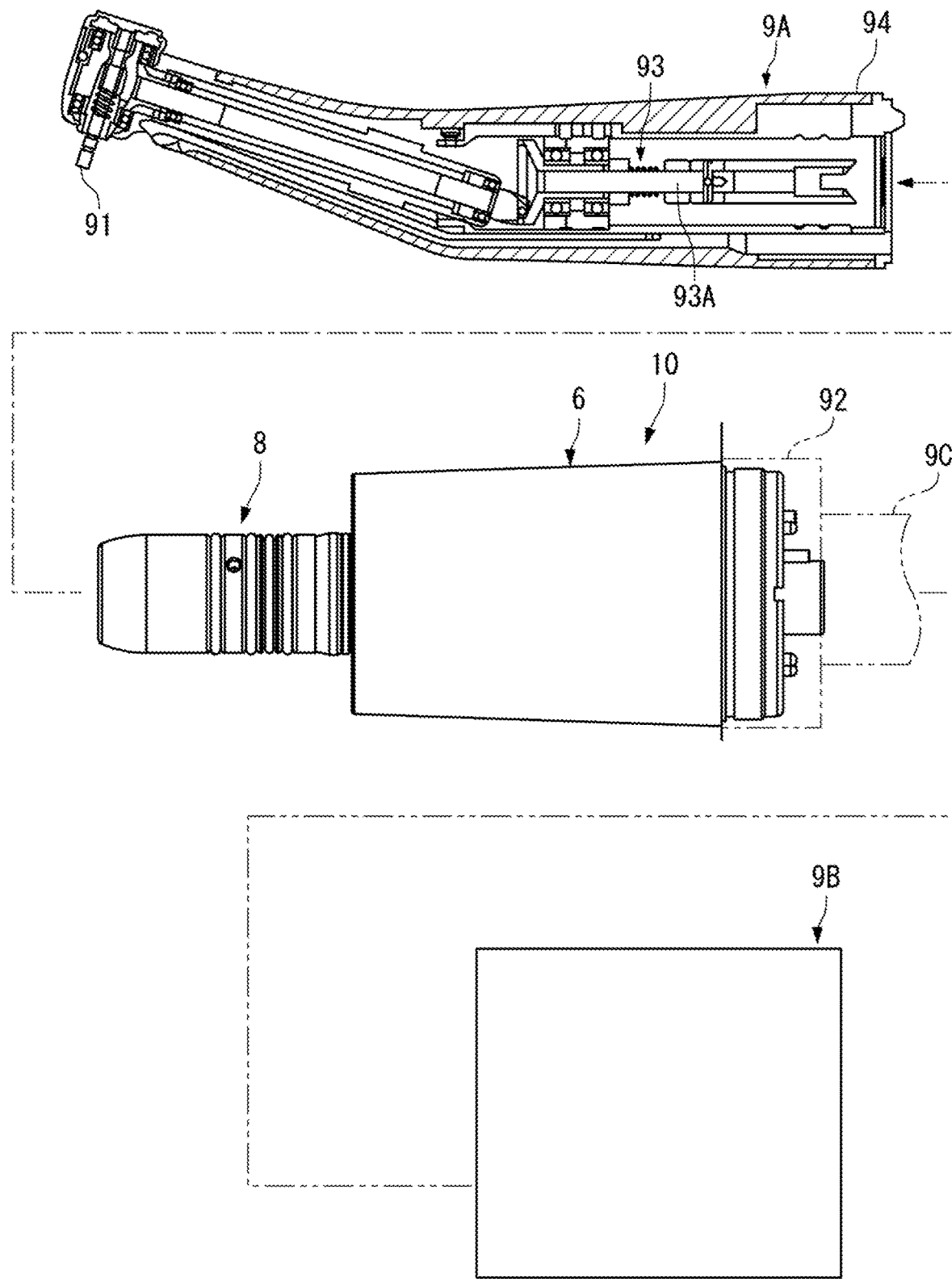
FIG. 1 is a diagram showing a dental device according to an embodiment of the present invention.

As shown in FIG. 1, a dental device according to the embodiment includes a dental handpiece 9A, a motor 10 that drives the handpiece 9A, and a controller 9B that performs the drive control of the motor 10, and the like. The dental device transmits the torque obtained by the motor 10, to a tool 91 positioned at a front end of the handpiece 9A, and cuts teeth with the tool 91 that is driven so as to be rotated.

[Schematic Configuration of Dental Motor]

FIG. 1 and FIGS. 2A to 2C show the external appearance of the motor 10 in the embodiment.

The handpiece 9A is attached to one end side of the motor 10. A hose 9C is provided on the other end side of the motor 10, through a connector 92. The motor 10 and the handpiece 9A are connected with the controller 9B through the hose 9C.

In the specification, in the motor 10, the side to which the handpiece 9A is attached is defined as "front", and the opposite side (the connector 92 side) is defined as "rear".

In the specification, unless otherwise mentioned, the "outer circumference" of a certain matter means an outside site of the matter along the rotation direction of the rotor 2, and the periphery of the site. The outside site described here is referred to as the "outer circumference portion". The radially outer side relative to the "outer circumference portion" is referred to as the "outside of the matter".

Then, in the specification, unless otherwise mentioned, the "inner circumference" of a certain matter means an inside site of the matter along the rotation direction of the rotor 2, and the inside relative to the site. The inside site described here is referred to as the "inner circumference portion". The radially inner side relative to the "inner circumference portion" is referred to as the "inside of the matter".

[Constituent Element of Motor]

Figure 3:
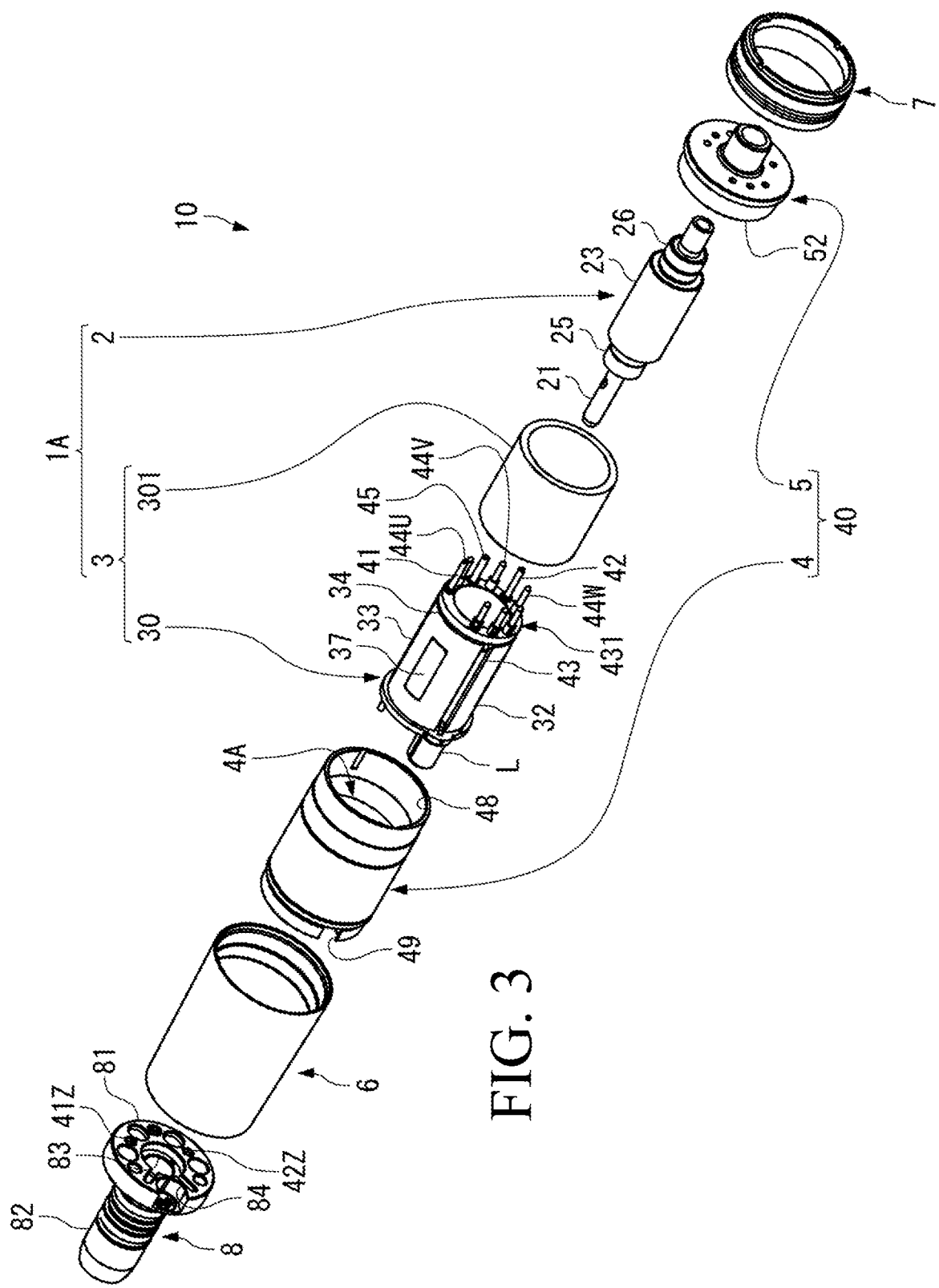
FIG. 3 is an exploded perspective view of the motor shown in FIGS. 2A to 2C.

As shown in FIG. 3, the motor 10, which is a brushless slotless motor, includes a rotor 2 and a stator 3 of a main element 1A that performs drive, an inner case 40 (a holder case 4 and a rear holder 5) for storing and holding them, a motor case 6, a ring screw 7, an insert cylinder 8 to which the handpiece 9A is attached in a detachable manner.

Hereinafter, these constituents will be described in order.

[Rotor]

Figure 6:
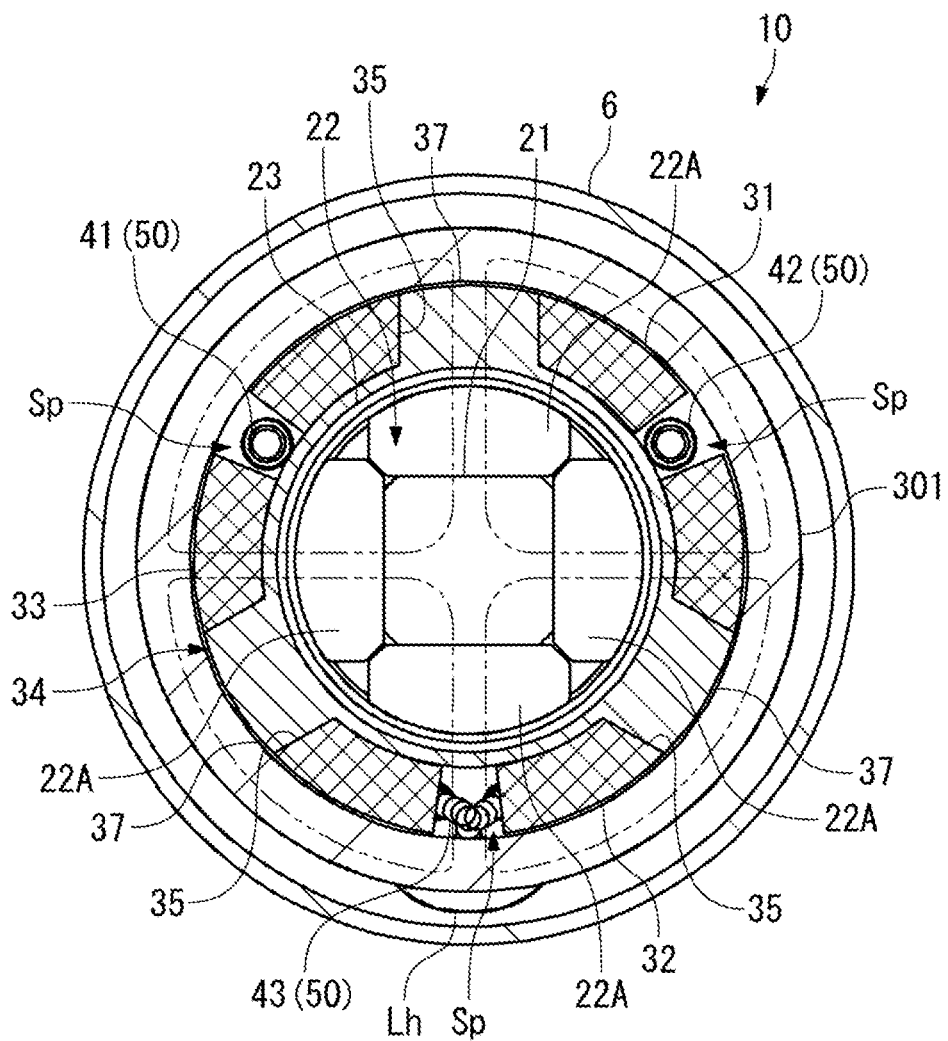
FIG. 6 is a VI-VI line arrow view of FIG. 2B.
Figure 7:
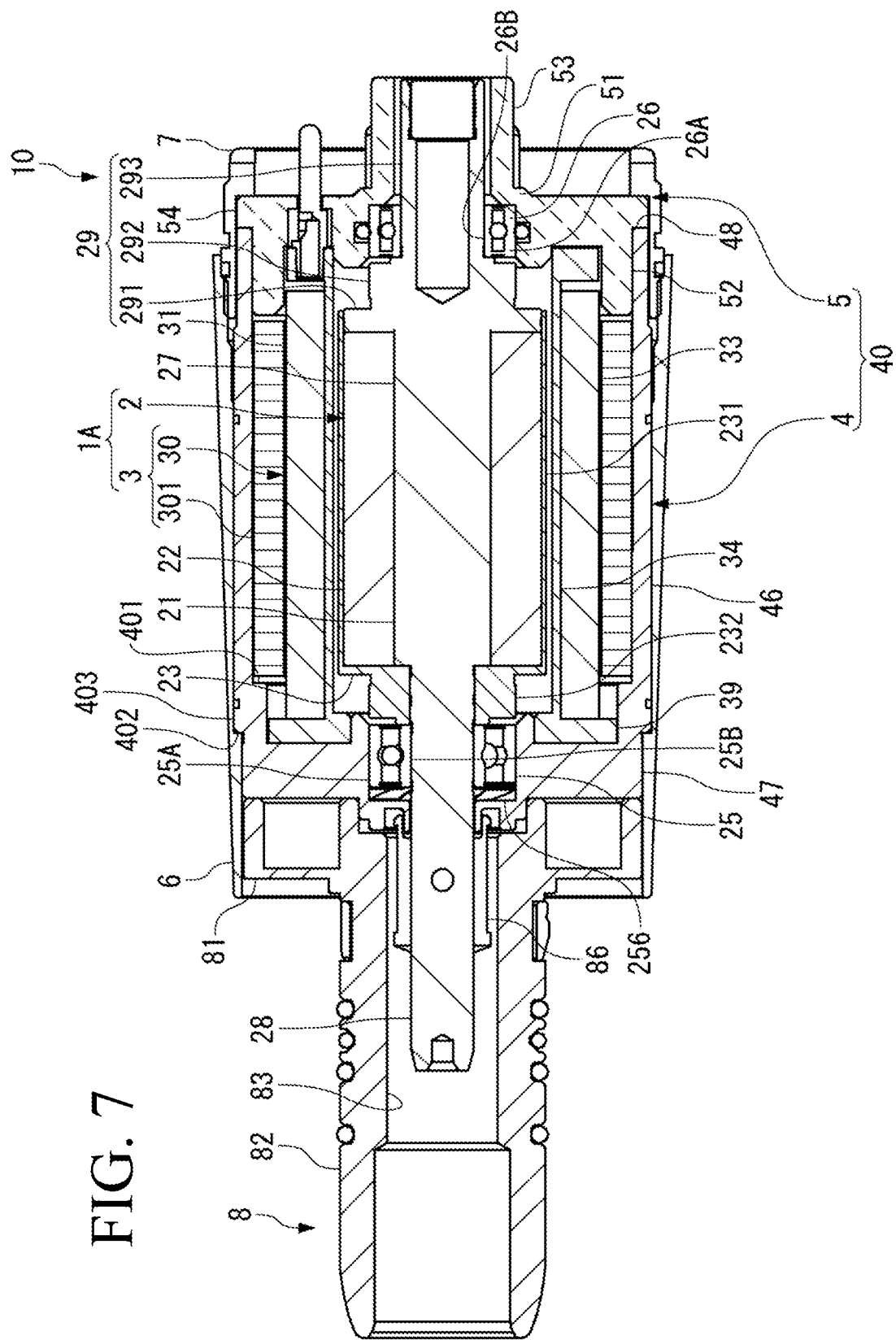
FIG. 7 is a VII-VII line arrow view of FIG. 2B.

As shown in FIG. 3, FIG. 6 and FIG. 7, the rotor 2 includes a shaft 21, a magnet 22 fixed to the shaft 21, which is a permanent magnet, and a cover holder 23 that covers the outer circumference portion of the magnet 22.

The magnet 22, which includes four poles, is constituted by four divided segments 22A, as shown in FIG. 6. Each segment 22A is oriented so as to have parallel anisotropy. However, each segment 22A may be oriented so as to have radial anisotropy.

Instead of these segmented magnets, an integrated ring magnet that is magnetized for four poles can be used, and both of radial anisotropy and polar anisotropy can be employed as the orientation in this case.

As shown in FIG. 7, the shaft 21 includes a central portion 27 at which the magnet 22 is provided, a front end portion 28 that is positioned at the front side of the central portion 27, and a rear end portion 29 that is positioned at the rear side of the central portion 27.

As shown in FIG. 3 and FIG. 7, a front bearing 25 is provided on the side of the front end portion 28 of the shaft 21, and a rear bearing 26 is provided on the side of the rear end portion 29 of the shaft 21. Each of these bearings 25, 26 is a ball bearing that includes spherical rolling elements (balls) between an inner ring and an outer ring. The inner ring of each of the bearings 25, 26 is fixed to the outer circumference portion of the shaft 21.

The front end portion 28 is connected with a rotation transmission mechanism 93 that is provided in the interior of the handpiece 9A for transmitting the rotation of the shaft 21 to the tool 91.

The rear end portion 29 includes a fitting portion 291 that is fitted to the rear end of the cover holder 23, a balance correction portion 292 that can be shaved off at the time of the shaft alignment for the shaft 21, and a bearing disposition portion 293 at which the rear bearing 26 is disposed.

The balance correction portion 292 is positioned between the rear end of the magnet 22 and the rear bearing 26.

As shown in FIG. 7, the cover holder 23 includes a cover portion 231 that covers the outer circumference portion of the magnet 22, and a balance correction portion 232 that abuts on the front end of the magnet 22 and that is used for balance correction.

The balance correction portion 232 is positioned between the front end of the magnet 22 and the front bearing 25. Each of the balance correction portion 232 and the above-described balance correction portion 292 is formed so as to have a larger diameter than the diameter of the central portion 27 of the shaft 21. It is preferable that the balance correction portion 232 and the balance correction portion 292 be set so as to have the same diameter.

[Stator]

Next, as shown in FIG. 3, the stator 3 includes a coil unit 30, and a cylindrical stator core 301 that is disposed on the outer circumference of the coil unit 30.

The stator core 301 is formed by laminating annular plates that are formed of magnetic metal and that have an insulating film formed on the surface.

(Coil Unit)

Figure 4:
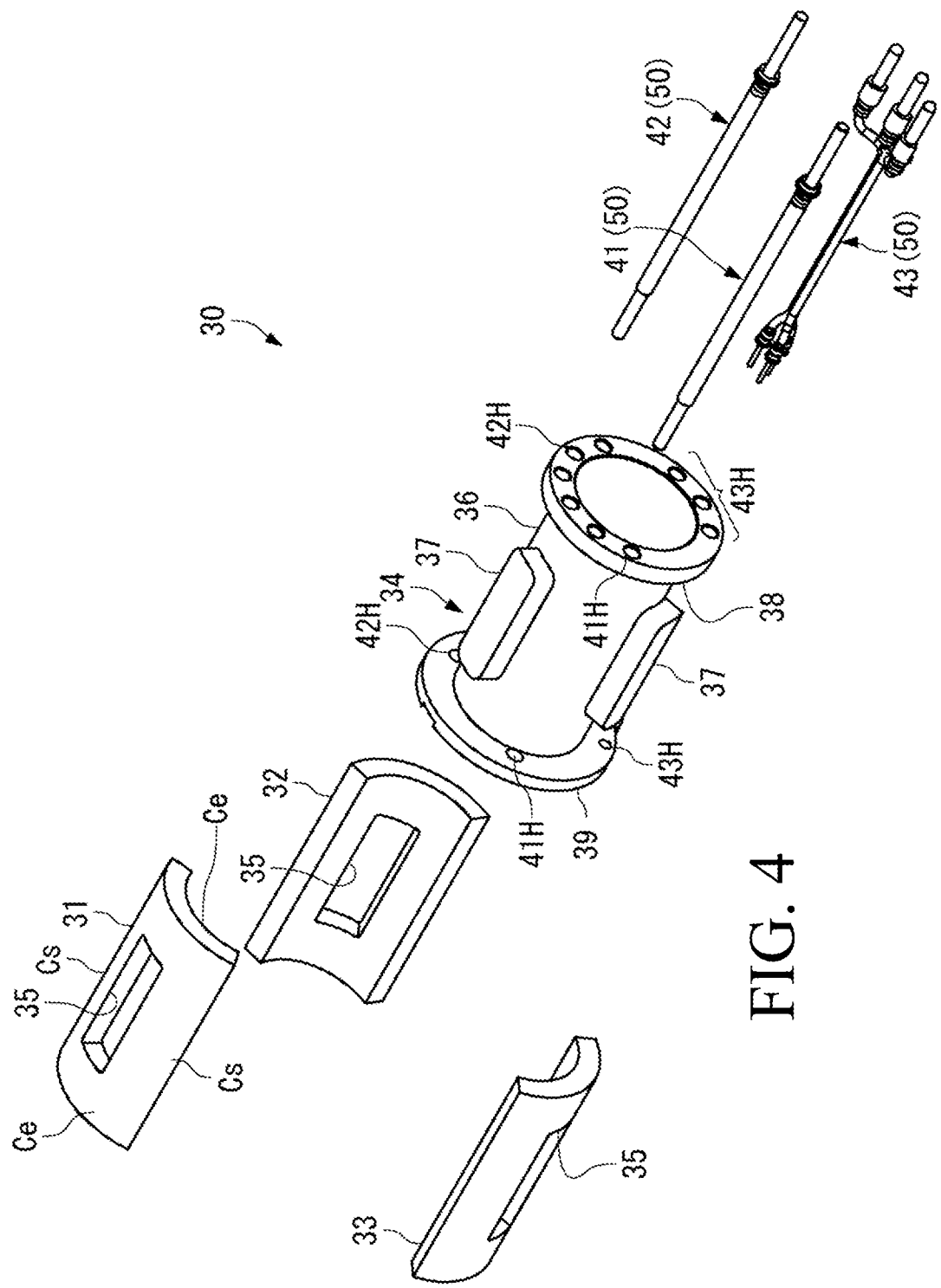
FIG. 4 is an exploded perspective view of a coil unit that is included in the motor shown in FIGS. 2A to 2C.

As shown in FIG. 4, the coil unit 30 includes three coils (winding wires) 31, 32, 33, a bobbin 34 that holds the coils 31 to 33, a water injection pipe 41, a chip air pipe 42, and a lighting electric wire 43.

Figure 8:
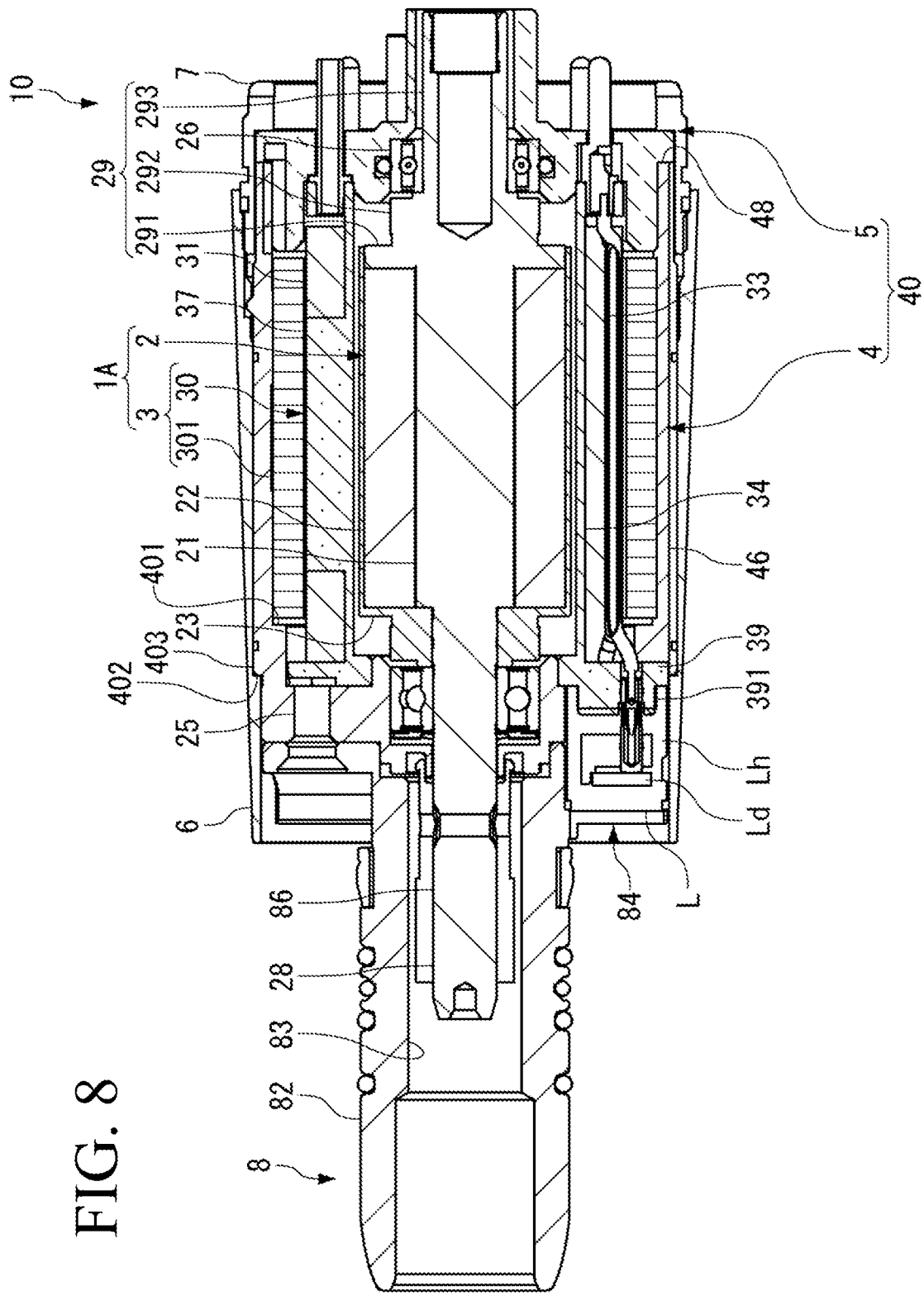
FIG. 8 is a VIII-VIII line arrow view of FIG. 2A.

A light source L (FIG. 3) to which electric power is supplied through the lighting electric wire 43 is incorporated into the coil unit 30 (FIG. 3 and FIG. 8).

The light source L includes a light emitting device Ld such as a white LED (Light Emitting Diode), and a housing Lh that holds the light emitting device Ld. The light emitting device Ld can be constituted by a single or a plurality of LEDs.

(Coil)

As shown in FIG. 4, the coil 31 is wound so as to have a rectangular shape in planar view, using a coated conductive wire in which a good conductor such as copper is coated with resin, and is shaped into a shape that is curved along the outer circumference portion of the bobbin 34.

Figure 5A:
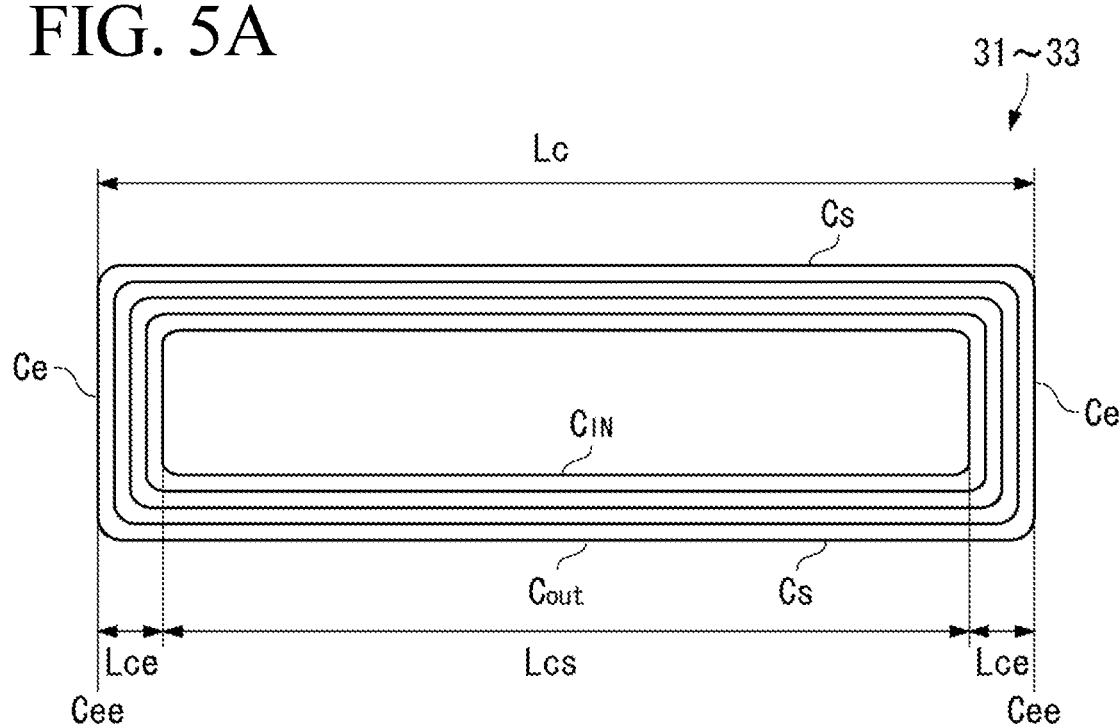
FIG. 5A and FIG. 5B are plan views showing coils.

As shown in FIG. 5A, the coil 31 has coil sides Cs and coil ends Ce. The coil sides Cs are linear sections that are disposed along the axial direction of the stator core 301. The coil ends Ce are sections that are positioned at both ends of the coil sides Cs.

The other coils 32, 33 are formed similarly to the coil 31. These coils 31 to 33 are connected so that an armature coil is formed.

For the coils 31 to 33, a round wire having a circular cross-section, a flat wire having a rectangular cross-section, or the like can be used.

The coils 31 to 33 are not limited to a rectangular shape in planar view, and may have an arbitrary shape such as a track shape (FIG. 5B), an ellipse and an oval.

The embodiment employs a non-lap winding as the disposition of the coils 31 to 33. The coils 31 to 33 each extend on independent regions that are less than 120° with respect to the shaft center of the shaft 21, and are disposed so as to be adjacent in the rotation direction of the rotor 2 without lapping over each other. In the non-lap winding, it is possible to shorten the length of one winding of the coil, compared to a lap winding in which the coil extends over a region of 180°, and therefore, it is possible to reduce coil resistance in the case of the same winding number. The smaller resistance can contribute to the enhancement of the output of the motor.

For efficiently operating the motor in the non-lap winding, the four-pole rotor 2 can be suitably employed for the three coils 31 to 33, as in the case of the embodiment. For the same reason, 3n coils and a 4n-pole rotor can be suitably employed (n is a natural number).

In addition, the combination of 3 nm coils and a 2n-pole rotor can be employed (n and m are natural numbers). For example, the combination of 3 coils and a 2-pole rotor, the combination of 6 coils and a 2-pole rotor, and the like are applicable.

Here, the central angle of the region where the coil extends is not limited to the above angle, and can be set to an appropriate angle depending on the number of coils.

A gap Sp (FIG. 6) having a predetermined size is provided between the adjacent coils of the coils 31 to 33. In the embodiment, there are three gaps Sp, and in these gaps Sp, the water injection pipe 41, the chip air pipe 42 and lighting electric wire 43 are disposed respectively.

In the embodiment, at the inside of the stator core 301, each of three medium pathways 50 that are the spaces occupied by the water injection pipe 41, the chip air pipe 42 and the lighting electric wire 43 respectively is disposed between the adjacent coils 31 to 33.

Here, the medium pathway 50 is a collective term of the spaces occupied by the water injection pipe 41, the chip air pipe 42 and the lighting electric wire 43 respectively.

The "spaces occupied" by the pipes 41, 42 and the electric wire 43 include necessary clearances at the peripheries of the pipes 41, 42 and the electric wire 43 in the adjacent-coil intervals among the coils 31 to 33 for disposing the pipes 41, 42 and the electric wire 43.

In the embodiment, each medium pathway 50 is disposed between the adjacent coils 31 to 33. Therefore, the space for disposing the medium pathways 50 is not necessary, at the outside of the stator core 301.

Here, an ineffective region that appears other than the region for the medium pathways 50 when the medium pathways 50 are incorporated in the motor 10 will be discussed.

If the medium pathways 50 are disposed at the outside of the stator core 301, an ineffective magnetic region adjacent to the medium pathways 50 in the circumferential direction is generated between the stator core 301 and the motor case 6.

On the other hand, in the embodiment, since each medium pathway 50 is disposed between the adjacent coils 31 to 33, the stator core 301 can be disposed so as to be extremely close to the inner circumferential surface of the motor case 6, and therefore, the ineffective magnetic region is not substantially generated.

Since such an ineffective region is not generated, the embodiment has an advantage when the outer diameter of the main element 1A is increased. It is possible to enhance the performance of the motor 10, by increasing the outer diameter of the main element 1A, that is, by increasing the winding number of the coils 31 to 33 or increasing the cross-section areas of the rotor 2 and the stator core 301.

(Bobbin)

As shown in FIG. 4, the bobbin 34, which is formed of an insulating resin, integrally includes a cylinder portion 36 that has a cylindrical shape and that is disposed coaxially with the shaft 21, three convex portions 37 that are provided so as to protrude from the outer circumference portion of the cylinder portion 36, a rear flange 38 that is positioned at a rear end of the cylinder portion 36, and a front flange 39 that is positioned at a front end of the cylinder portion 36.

The convex portion 37 is formed so as to have a height nearly equal to the thickness of the coils 31 to 33, and is formed in a shape corresponding to an opening 35 at the inside of each of the coils 31 to 33, that is, here, in an ellipse shape in planar view that is long in the axial direction of the shaft 21. The convex portions 37 are disposed at regular intervals in the circumferential direction of the bobbin 34 (FIG. 6), and the coils 31 to 33 are fitted to the convex portions 37.

The convex portion 37 positioned in the opening 35 of each of the coils 31 to 33 has the function of the positioning and holding in the circumferential direction and axial direction of the coils 31 to 33. As long as the function can be fulfilled, the convex portion 37 may have any shape.

The rear flange 38 and the front flange 39 protrude from the cylinder portion 36 in the radially outward direction. On these flanges 38, 39, a plurality of through-holes passing in the thickness direction are formed. The rear flange 38 projects from the cylinder portion 36 by a size equivalent to the height of the convex portion 37, and is put in the inside of a fitting portion 52 of the rear holder 5 described later. The front flange 39 is larger than the rear flange 38 in the protruding size from the cylinder portion 36, and is put in the inside of the holder case 4.

On the front flange 39, a protrusion 391 (FIG. 8) that protrudes forward is formed. The protrusion 391 engages with the housing Lh of the light source L, and thereby, the light source L is provided in the bobbin 34.

(Pipes for Water and Air, Lighting Electric Wire)

The dental device in the embodiment lights a cut site in the mouth cavity by the light emitted from the front end of the handpiece 9A, and cleans the cut site by the water and air discharged from the front end similarly. For actualizing these functions, the water injection pipe 41, the chip air pipe 42 and the lighting electric wire 43 are provided in the motor 10.

As shown in FIG. 4, the water injection pipe 41, the chip air pipe 42 and the lighting electric wire 43 are disposed along the axial direction of the bobbin 34, in the range from the rear flange 38 to the front flange 39.

The water injection pipe 41 passes through holes that are formed on the rear flange 38 and the front flange 39 respectively, and is incorporated into rim portions of the holes. The same goes for the chip air pipe 42. Also, terminals at both ends of the lighting electric wire 43 pass through holes that are formed on the rear flange 38 and the front flange 39 respectively, and are incorporated into rim portions of the holes. The lighting electric wire 43 is connected with the light source L (FIG. 8). The light emitted by the light source L is led to the front end of the handpiece 9A, through an optical fiber (unillustrated) that is a light transmission pathway.

In addition to the holes for incorporating the water injection pipe 41, the chip air pipe 42 and the lighting electric wire 43, a plurality of holes are formed on the rear flange 38, and as shown in FIG. 3, motor terminals 44U, 44V, 44W and a cooling air pipe 45 engage with the respective holes.

The motor terminals 44U, 44V, 44W are connected with the coils 31 to 33, respectively, and are connected with the controller 9B through the electric wires in the motor 10, the connector 92 and the hose 9C. When the three-phase alternating current generated by the controller 9B is applied to the coils 31 to 33 through the motor terminals 44U, 44V, 44W, a rotating magnetic field is generated in the stator 3. By the interaction between the rotating magnetic field and a magnetic field generated by the magnet 22, the rotor 2 is rotated around the shaft 21.

The cooling air pipe 45 supplies air to the coils 31 to 33 through the hole of the rear flange 38, and thereby, cools the coils 31 to 33 and peripheral members.

[Holding Element of Motor]

Next, as elements for storing and holding the rotor 2 and the stator 3, the inner case 40, the motor case 6 and the ring screw 7 will be each described in order.

(Inner Case)

As shown in FIG. 3 and FIG. 7, the inner case 40 includes the holder case 4 (case body) that includes a storage space 4A for storing the rotor 2 and the stator 3 and an opening 48 leading to the storage space 4A, and the rear holder 5 (end portion case) that is fitted to the holder case 4 through the opening 48.

The holder case 4 is a roughly cylindrical member including a cover portion 46 that surrounds the outer circumference portion of the stator core 301, a holding portion 47 that holds the front bearing 25, and the opening 48 that is formed in the axial direction at the rear end side of the cover portion 46.

A cutout 49 (FIG. 3) into which a part of the housing Lh of the light source L is inserted is formed at a front end rim portion of the holder case 4.

At the holding portion 47, a waved washer 256 (spring member) to give preload to both of the bearings 25, 26 is disposed for the sake of efficiently sliding the front bearing 25 and the rear bearing 26. The waved washer 256 is a wave-shaped annular metal washer that can be compressed in the axial direction, and is disposed so as to face the outer ring 25A of the front bearing 25.

An abutting portion 401 (FIG. 7) on which the front end surface of the stator core 301 abuts is formed at the front end of the inner circumference portion of the holder case 4. The abutting portion 401 protrudes in the radially inward direction from the inner circumference surface of the cover portion 46 that faces the outer circumference surface of the stator core 301, and continues in the circumferential direction of the holder case 4.

An engagement portion 402 that engages with the inner circumference portion of the motor case 6 is formed at the front end of the outer circumference portion of the holder case 4. The diameter of the front end of the holder case 4 is reduced relative to the outer diameter of the cover portion 46, and the engagement portion 402 is a portion that projects in the radially outward direction from the outer circumference surface of the front end of the holder case 4. The engagement portion 402 is formed continuously in the circumferential direction.

A section 403 having a larger thickness than the wall thickness of a portion of the cover portion 46 that faces the outer circumference portion of the stator core 301 is set between the engagement portion 402 and the abutting portion 401.

The rear holder 5 includes a holding portion 51 that holds the rear bearing 26, a fitting portion 52 that is fitted to the inside of the holder case 4, and a cylinder portion 53 that protrudes from the holding portion 51 rearward. The connector 92 engages with the rear end portion of the shaft 21 that is positioned at the inside of the cylinder portion 53.

On the holding portion 51, a plurality of holes corresponding to the holes of the rear flange 38 of the bobbin 34 are formed so as to pass through in the axial direction (FIG. 2C and FIG. 3).

The fitting portion 52 cylindrically projects from the holding portion 51 by an axis-directional size (fitting length) that is necessary for surely fitting the rear holder 5 into the holder case 4 and securing the coaxiality between the constituent components.

(Motor Case)

The motor case 6 is a cylindrical member that surrounds the outer circumference portion of the holder case 4. In the motor case 6, the diameter is slightly expanded, from the front end to the rear end.

(Ring Screw)

The ring screw 7 (FIG. 3 and FIG. 7) fixes the holder case 4, the rear holder 5 and the motor case 6 at predetermined positions, respectively. A female screw that engages with screws formed on the outer circumference portion of the rear holder 5 and the outer circumference portion of the holder case 4 is formed on the inner circumference portion of the ring screw 7. A male screw that engages with a screw formed on the inner circumference portion of the motor case 6 is formed on the outer circumference portion of the ring screw 7. When the ring screw 7 is screwed between the holder case 4/rear holder 5 and the motor case 6, the relative positions of the constituent components of the motor 10 are determined.

[Insert Cylinder]

As shown in FIG. 3 and FIG. 7, the insert cylinder 8 includes a base portion 81 that is held in the inside of the front end of the motor case 6, and a connection portion 82 that protrudes from the base portion 81 forward. An insertion hole 83 into which the front end side of the shaft 21 is inserted is formed on the inside of the insert cylinder 8.

The connection portion 82 is inserted into the inside of a connection portion 94 of the handpiece 9A (FIG. 1), and the shaft center is matched between the shaft 21 and a shaft 93A of a rotation transmission mechanism 93 of the handpiece 9A. The shaft 21 extends to about half of the axis-directional length of the connection portion 82.

A claw clutch 86 for connecting the shaft 93A of the rotation transmission mechanism 93 and the shaft 21 is disposed at the inside of the connection portion 82. The claw clutch 86 is provided at the front end portion of the holder case 4.

The base portion 81 is formed so as to be thick enough to be surely held in the inside of the motor case 6, for supporting the connection portion 82 coaxially with the shaft 21.

On the base portion 81, a light source storage hole (FIG. 3) in which the light source L is stored is formed so as to pass through in the thickness direction.

The light source storage hole 84 is a nearly circular opening along the axial direction, and appears as a slit on the outer lateral surface of the base portion 81. The housing Lh of the light source L is fitted to the inside of the light source storage hole 84, and thereby, the position of the light source L is determined. A part of the outer lateral surface of the housing Lh of the light source L faces the inner circumference portion of the motor case 6, across the light source storage hole 84 and the cutout 49 (FIG. 3) of the holder case 4 (FIG. 6).

An inlet port of a pathway 41Z that is connected with the front end of the water injection pipe 41, an inlet port of a pathway 42Z that is connected with the front end of the chip air pipe 42, the hole 43H through which the optical fiber connected with the light source L passes, and three engagement holes 87 (FIG. 2A) are formed around the insertion hole 83 of the base portion 81.

The pathway 41Z leads to an unillustrated outlet port that is positioned on the outer lateral surface of the connection portion 82. The pathway 42Z also leads to an unillustrated outlet port that is positioned on the outer lateral surface of the connection portion 82.

When the handpiece 9A is attached to the connection portion 82, protrusions on the handpiece 9A side engage with the engagement holes 87 (FIG. 2A), and thereby, the positions of the handpiece 9A and motor 10 in the circumferential direction are determined. Thereby, it is possible to surely connect the pipes 41, 42 and the light source L, to the pathways and optical fiber incorporated in the handpiece 9A.

[Assembly of Motor]

An example of the procedure for assembling the motor 10 in the embodiment will be described.

First, the rotor 2 can be assembled as follows.

The shaft 21 having the segments 22A of the magnet 22 adhere to the outer circumference portion is inserted into the inside of the cover holder 23 from the rear side, and the front end surface of the central portion 27 of the shaft 21 abuts to the inside of the front end of the cover holder 23. Then, the fitting portion 291 of the shaft 21 is fitted to the rear end of the cover portion 231. Thereby, the relative positions of the shaft 21 and the magnet 22 are determined.

Furthermore, the inner ring 25B of the front bearing 25 is fixed to the front end side of the shaft 21, and the inner ring 26B of the rear bearing 26 is fixed to the rear end side of the shaft 21.

The coil unit 30 can be assembled as follows.

The coils 31 to 33 are fitted to the convex portions 37 of the bobbin 34, respectively. Next, the pipes 41, 42 and the lighting electric wire 43 are incorporated into the flanges 38, 39 of the bobbin 34, and are disposed among the coils 31 to 33. Here, the coils 31 to 33 may be incorporated into the bobbin 34 after the pipes 41, 42 and the lighting electric wire 43 are incorporated into the bobbin 34.

Next, the rotor 2 is inserted into the inside of the bobbin 34, and furthermore, the coil unit 30 is inserted into the inside of the stator core 301 from the side of the rear flange 38. Thereby, the main element 1A of the motor 10 is assembled.

Then, the holding elements and the insert cylinder 8 are incorporated with the main element 1A.

The main element 1A is stored in the inside of the holder case 4 through the opening 48. The front bearing 25 is stored in the inside of the holding portion 47 of the holder case 4, and the shaft 21 passes through the holding portion 47 of the holder case 4 and protrudes forward.

Then, the rear holder 5 is fitted to the holder case 4 through opening 48. The rear bearing 26 is stored in the inside of the holding portion 51 of the rear holder 5, and the shaft 21 passes through the rear holder 5 and protrudes rearward.

Subsequently, the rear end of the insert cylinder 8 is inserted into the inside of the motor case 6, and the base portion 81 is stored in the motor case 6. The base portion 81 is positioned and held at the front end of the motor case 6.

Then, the incorporated body of the main element 1A and the holder case 4 is also stored in the motor case 6. The engagement portion 402 of the holder case 4 is engaged with the front end of the inner circumference portion of the motor case 6, and thereby, the positioning of the holder case 4 is performed relative to the motor case 6. The front end portion of the holder case 4 abuts on the base portion 81 of the insert cylinder 8.

Finally, the ring screw 7 is inserted and tightened between the motor case 6 and the holder case 4/rear holder 5.

Thus, the assembly of the motor 10 is finished.

In assembled the motor 10, the relative position misalignment of each of the stator core 301, the coil unit 30 and the rotor 2 is restricted. In the following, the description will be made with reference to FIG. 7.

The abutting portion 401 of the holder case 4 faces the front end surface of the stator core 301. The fitting portion 52 of the rear holder 5 faces the rear end surface of the stator core 301. The positioning of the stator core 301 is performed between the abutting portion 401 and the fitting portion 52.

Further, the front end portion of the holder case 4 faces the front flange 39 of the bobbin 34 of the coil unit 30. The rear holder 5 faces the rear flange 38 of the bobbin 34. The positioning of the coil unit 30 is performed between the front end portion of the holder case 4 and the rear holder 5.

Then, the positioning of the rotor 2 is performed along with the preload of the front bearing 25 and the rear bearing 26.

When the rear holder 5 is fitted to the holder case 4 until a terminal end 54 (FIG. 7) of the rear holder 5 abuts on the rear end surface of the holder case 4, the holding portion 51 of the rear holder 5 presses the outer ring 26A of the rear bearing 26 forward. The pressing force is transmitted to the shaft 21 through the balls and inner ring 26B of the rear bearing 26, and displaces forward the inner ring 25B of the front bearing 25 fixed to the front end side of the shaft 21. When the inner ring 25B of the front bearing 25 is displaced, the outer ring 25A of the front bearing 25 is also displaced forward through the balls. When the waved washer 256 is compressed by the outer ring 25A, the waved washer 256 generates the elastic force to press the outer ring 25A of the front bearing 25 rearward.

As described above, by the force to press the outer ring 26A of the rear bearing 26 forward and the elastic force to press the outer ring 25A of the front bearing 25 rearward, the positions of the outer ring 25A and inner ring 25B of the front bearing 25 and the positions of the outer ring 26A and inner ring 26B of the rear bearing 26 are relatively misaligned. Therefore, the gap (backlash) at the periphery of the balls is eliminated, and both of the front bearing 25 and the rear bearing 26 are preloaded.

In the state where the bearings 25, 26 are preloaded, the shaft 21 is disposed at a predetermined position. The positioning of the magnet 22 is performed between the rear end portion 29 of the shaft 21 and the front end portion of the cover holder 23 fitted to the shaft 21.

[Main Characteristic of Embodiment]

For achieving the downsizing while maintaining the performance of the motor 10, the main element 1A of the motor 10 and associated members and sites need to be disposed in the space on the inside of the motor case 6, without waste. The following constituent requirements provided in the embodiment for that reason will be described with reference to FIG. 9 and FIG. 7.

First Requirement: The length Lf of the stator core 301 in the axial direction is shorter than the length Lc of the coils 31 to 33 in the axial direction (Lf<Lc).

Second Requirement: The length Lm of the magnet 22 in the axial direction is shorter than the length Lf of the stator core 301 in the axial direction (Lm<Lf).

[Function Effect of Embodiment]

In the following, the function effects of both of the first requirement and the second requirement will be described in order.

(1) First Requirement: Lf<Lc

The requirement Lf<Lc relates to the utilization of the space at the periphery of the stator core 301.

Because of Lf<Lc, the end portions of the stator core 301 recedes (is offset) relative to the end portions of the coils 31 to 33 (the end portions of the coil ends Ce), and therefore, ringed spaces that are adjacent to the end surfaces of the stator core 301 and that are positioned at the outside of the coils 31 to 33 are produced.

In the embodiment, at both of the front end side and the rear end side, the end portions of the stator core 301 recede relative to the end portions of the coils 31 to 33 (the end portions of the coil ends Ce). Therefore, a rear first space Sr1 adjacent to the rear end surface of the stator core 301 is formed, and a front first space Sf1 adjacent to the front end surface of the stator core 301 is formed. The rear first space Sr1 and the front first space Sf1 are formed on the whole circumferences of the end portions of the stator core 301.

The rear first space Sr1 contains a part of the fitting portion 52 (FIG. 7) of the rear holder 5.

Here, in the case of Lf≥Lc, the stator core 301 extends to the rear ends of the coils 31 to 33 or to positions beyond the rear ends, and the fitting portion 52 is disposed at a further rearward side relative to the rear end of the stator core 301. For securing the coaxiality of the constituent components, the fitting portion 52 needs to extend over a predetermined length in the axial direction, and needs to be fitted to the motor case 6. Therefore, in the case of Lf≥Lc, the length of the motor case 6 needs to be longer compared to the embodiment.

That is, according to the embodiment, the fitting portion 52 is disposed in the rear first space Sr1 created by shortening the length Lf of the stator core 301, and thereby, it is possible to downsize the motor 10 in the axial direction.

Further, the abutting portion 401 of the holder case 4 on which the front end surface of the stator core 301 abuts is disposed in the front first space Sf1.

Here, between the abutting portion 401 and the engagement portion 402, the section 403 for securing the wall thickness of the holder case 4 is set over a predetermined length. In the case of Lf<Lc, a part of the section 403 is disposed in the front first space Sf1. On the other hand, in the case of Lf≥Lc, the section 403 is provided at a further forward side relative to the front end of the stator core 301, which is positioned at a more forward side than that in the embodiment. Therefore, the length of the holder case 4 needs to be longer compared to the embodiment, and accordingly, the total length of the motor case 6 becomes longer.

That is, it is possible to downsize the motor 10, also in that the abutting portion 401 of the holder case 4 is disposed in the front first space Sf1.

Figure 5B:
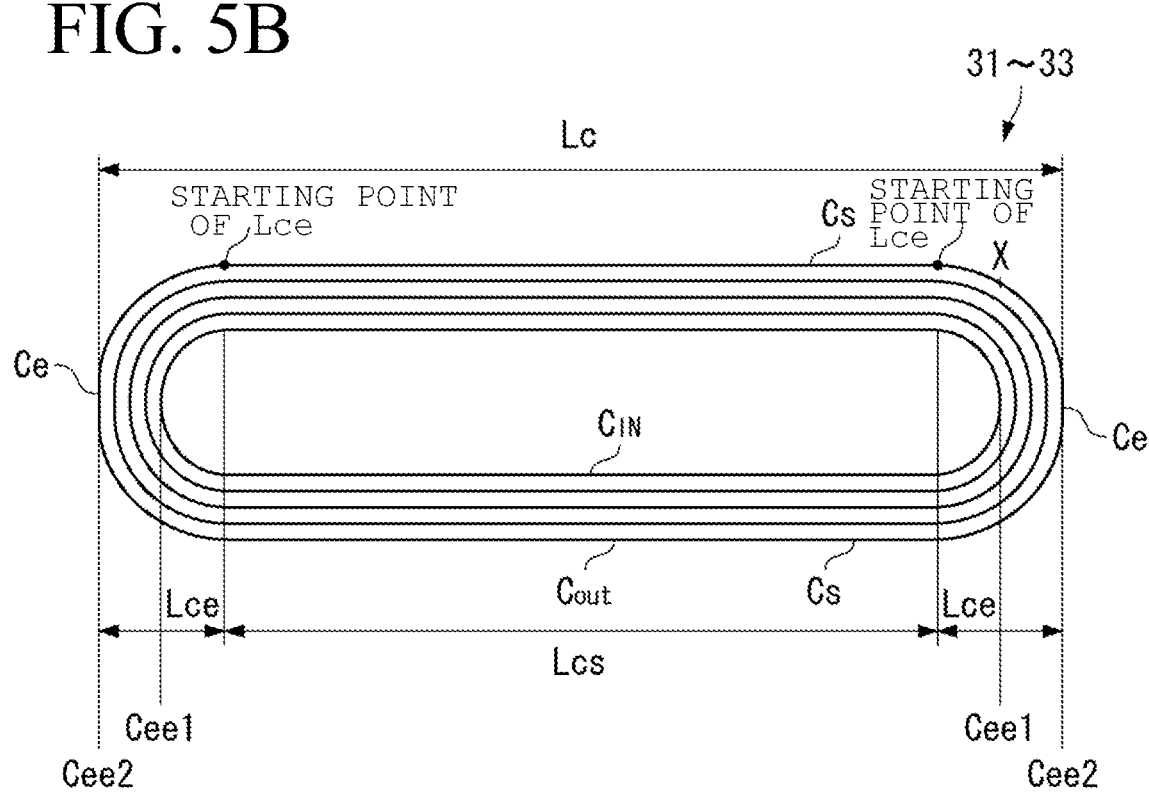

By the way, even when Lf<Lc holds as in the case of the embodiment, the performance of the motor 10 does not greatly decrease. This is because the coil sides Cs (FIG. 5A) along the axial direction, which can interlink the magnetic flux generated from the coils with the stator core 301 in the radial direction, mainly contribute to the generation of torque, and the degree of the contribution to the torque generation of the coil ends Ce, which are bent with respect to the coil sides Cs, is low. When the coils 31 to 33 are formed in a track shape as shown in FIG. 5B, the straight line component along the axial direction is partially contained in ranges in which the coils are curved from the axial direction toward the direction orthogonal to the axial direction, but still, the degree of the contribution of the coil ends Ce to the torque generation is low.

Accordingly, based on the low degree of the contribution of the coil ends Ce to the torque generation, members and sites at the periphery of the stator core 301 are disposed in the rear first space Sr1 and front first space Sf1 formed by purposely shortening the stator core 301 relative to the coils 31 to 33 and making the stator core 301 recede relative to the end portions of the coils 31 to 33 (the end portions of the coil ends Ce). Thereby, it is possible to achieve the downsizing while securing the performance.

As described above, from the standpoint of the securement of a sufficient output torque of the motor 10, it is preferable that the stator core 301 be provided on the whole of the coil sides Cs, at which the degree of the contribution to the torque generation is high. From this, the length Lf of the stator core 301 can be set such that the length Lf of the stator core 301 is equal to the length Lcs (FIG. 5A) of the coil sides Cs or the length Lf of the stator core 301 is longer than the length Lcs of the coil sides Cs (Lf≥Lcs).

The length Lcs of the coil sides Cs means the length of a range in which the coils 31 to 33 linearly extend on both of the inner diameter side $C_{IN}$ and the outer diameter side $C_{OUT}$.

Here, the relation in length between the coil sides Cs and the stator core 301 will be discussed.

In a range in which the stator core 301 extends from one end to the other end of the coil sides Cs (a range denoted by Lcs in FIG. 5A), the coils 31 to 33 linearly extend on both of the inner diameter side $C_{IN}$ and the outer diameter side $C_{OUT}$. Therefore, the performance of the motor monotonically increases as the length Lf of the stator core 301 and the length Lcs of the coil sides Cs increase (the performance is proportional to the Lf and the Lcs).

On the other hand, in ranges of the stator core 301 in which the length is longer than the length Lcs of the coil sides Cs and is shorter than the length Lc including the coil sides Cs and the coil ends Ce (in ranges denoted by Lce in FIG. 5A), the linearity is lost on the inner diameter side $C_{IN}$ of the coils 31 to 33, but the linearity is kept on the outer diameter side $C_{OUT}$. Therefore, although the performance does not monotonically increase, the performance increases depending on the Lf and the Lce because the portions to contribute to the performance are kept on the outer diameter side $C_{OUT}$. Also on the outer diameter side $C_{OUT}$, the linearity becomes smaller at positions closer to terminal ends Cee of the coil end Ce, and therefore, the rate of the increase in the performance decreases.

Here, FIG. 5B is the same in concept as FIG. 5A. In FIG. 5B, in ranges of the stator core 301 in which the length is longer than the length Lcs of the coil sides Cs and is shorter than the length Lc including the coil sides Cs and the coil ends Ce, that is, in ranges denoted by Lce, linear portions exist on the outer diameter side $C_{OUT}$ from the starting points of the Lce to positions X corresponding to positions of terminal ends Cee1 of the inner diameter side $C_{IN}$. Portions from the positions X to terminal ends Cee2 of the outer diameter side $C_{OUT}$ are curved. Also in the case of FIG. 5B, in the range denoted by Lce, although the performance does not monotonically increase, the performance increases depending on the Lf and the Lce because the linear portions to contribute to the performance partially exist.

Thus, it is preferable to create the necessary spaces Sf1, Sr1 and thereby perform the downsizing in the axial direction with no influence on the performance, by providing the stator core 301 over the whole of the length Lcs of the coil sides Cs and adopting the relation of Lc>Lf≥Lcs.

(2) Second Requirement: Lm<Lf

The requirement Lm<Lf relates to the utilization of the space at the periphery of the rotor 2.

The length Lm of the magnet 22 in the axial direction is shorter than the length Lf of the stator core 301 in the axial direction (Lm<Lf).

By the above first requirement and second requirement, Lf<Lc and Lm<Lf are satisfied among the three: the length Lm of the magnet 22, the length Lf of the stator core 301 and the length Lc of the coils 31 to 33.

It is necessary to dispose members such as the bearings 25, 26 and the balance correction portions 292, 232, and parts (sites) of the members, at the peripheral region of the shaft 21 that supports the magnet 22. Further, a space (hereinafter, sometimes referred to as a preload space) for disposing the waved washer 256 that gives preload by pressing the respective outer rings 25A, 26A of the bearings 25, 26 from both sides in the axial direction is necessary at the region. The necessary length of the rotor 2 including the region is longer than the stator 3 (the stator core 301 and the coils 31 to 33), resulting in the influence on the total length of the motor 10.

In the embodiment, at both of the front end side and the rear end side, the end portions of the magnet 22 recede relative to the end portions of the stator 3 (the end portions of the coil ends Ce). Therefore, a rear second space Sr2 adjacent to the rear end surface of the magnet 22 is formed, and a front second space Sf2 adjacent to the front end surface of the magnet 22 is formed. The rear second space Sr2 and the front second space Sf2 are formed on the whole circumference of the magnet 22.

The fitting portion 291 of the shaft 21 that is fitted to the rear end of the cover holder 23, and the balance correction portion 292 are disposed in the rear second space Sr2.

The front end portion of the cover holder 23 containing the balance correction portion 232 is disposed in the front second space Sf2.

In the case of Lm≥Lf, the fitting portion 291 and balance correction portion 292 that are positioned at a rearward side relative to the rear end of the magnet 22 are disposed at a more rearward side compared to the embodiment (Lm<Lf). The fitting portion 291 to be fitted to the cover holder 23 needs to extend over a predetermined length, for securing the coaxiality of the shaft 21 and the magnet 22. Further, the balance correction portion 292 and the balance correction portion 232 need to have predetermined lengths for balance adjustment. Accordingly, it is difficult to shorten the lengths of the fitting portion 291 and the balance correction portion 292.

The same goes for the front end side, and in the case of Lm≥Lf, the front end portion of the cover holder 23 including the balance correction portion 232 that is positioned at a forward side relative to the front end of the magnet 22 is disposed at a more forward side compared to the embodiment (Lm<Lf). Since the balance correction portion 232 needs to have a predetermined length for balance adjustment, it is difficult to shorten the length of the balance correction portion 232.

As described above, in the case of Lm≥Lf, compared to the embodiment, the necessary length of the rotor 2 including members/components associated with the rotor 2 and the preload space is longer in the axial direction, and also the motor case 6 containing the rotor 2 and the associated members is longer in the axial direction.

That is, according to the embodiment, the spaces adjacent to the end surfaces of the magnet 22 are produced by purposely setting the length Lm of the magnet 22 such that it is shorter relative to the length Lf of the stator core 301 in the axial direction (Lm<Lf). It is possible to reduce the necessary length of the rotor 2 including the members/sites disposed at the periphery of the rotor 2 and the preload space, by the quantity of the spaces, and therefore, it is possible to downsize the motor 10 in the axial direction.

Here, even when Lm<Lf holds as in the case of the embodiment, the performance of the motor 10 does not greatly decrease compared to the case of Lm≥Lf. In the following, the description will be made.

The magnetic flux generated by the magnet 22 forms magnetic flux loops (two-dot chain lines in FIG. 6) in which the magnetic flux passes through the respective coils 31 to 33, flows into the stator core 301 and returns to the magnet 22. When the magnetic flux becomes the leakage magnetic flux that reaches peripheral members (for example, the motor case 6) formed of metal, the ineffective magnetic flux that does not pass through the coils increases, and further, the leakage magnetic flux generates eddy current and generates heat, resulting in the decrease in the efficiency and performance of the motor. Accordingly, it is important that the magnetic flux generated from the magnet 22 flows only through the stator core 301, in which the eddy-current loss is suppressed by the lamination of magnetic plates.

Particularly, in slotless motors, the magnetic distance between the magnet 22 and the stator core 301 is long, compared to slot motors. Therefore, originally, the magnetic resistance tends to be large, and therefore, it is important to adopt a structure in which the magnetic flux is unlikely to leak.

Here, due to the principle of the magnet 22, the magnetic flux generated near the end portions of the magnet 22 is stronger compared to the magnetic flux generated near the central portion of the magnet 22 (the magnetic flux density is high).

In the case of Lm≥Lf, the magnetic flux is likely to be saturated at the end portions of the stator core 301 that face the end portions of the magnet 22, at which the strong magnetic flux is generated. Thereby, the magnetic flux leakage from the stator core 301 occurs, and the magnetic flux enters the metallic motor case 6 at the outside of the stator core 301. Further, the magnetic flux does not pass through the stator core 301 from the magnet 22, and leaks into the shaft 21 and the bearings. When the magnetic flux leaked by the saturation of the magnetic flux flows into the motor case 6, the shaft 21, the bearings and the like, the effective magnetic flux to pass through the coils 31 to 33 is lost, and further, eddy current is generated so that heat is generated, resulting in the decrease in the efficiency and performance of the motor.

Figure 9:
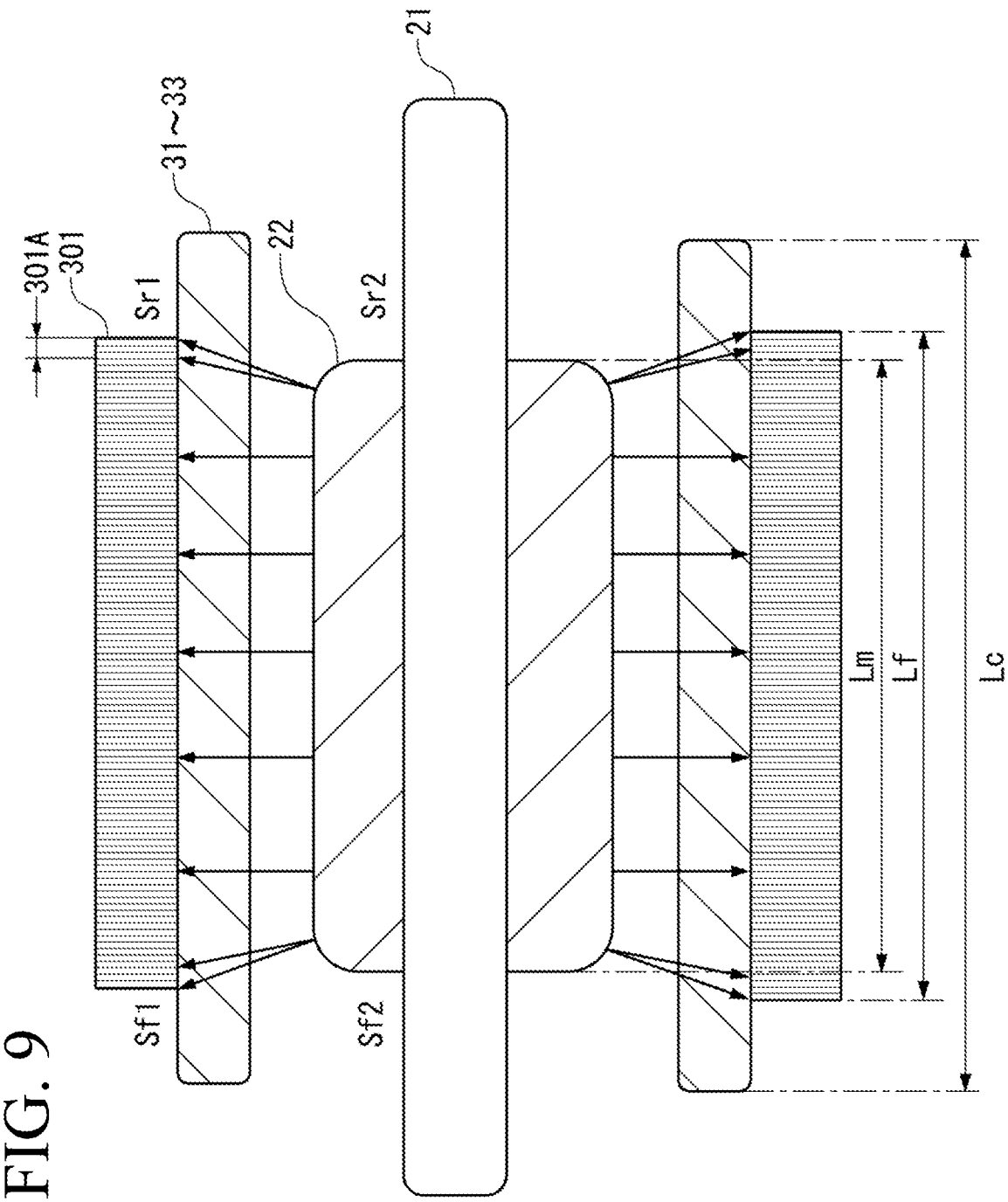
FIG. 9 is a schematic view showing relative lengths of a coil, a stator core and a magnet in an axial direction.

On the other hand, when the second requirement, that is, Lm<Lf is met, the stator core 301 can be disposed also at the end portions of the magnet 22 so as to face them, and the strong magnetic flux generated from the end portions of the magnet 22 can be dispersed to the ranges in which the stator core 301 protrudes in the axial direction relative to the end surfaces of the magnet 22 (see arrows in FIG. 9). Thereby, the magnetic flux is unlikely to be saturated at the end portions of the stator core 301, and therefore, the strong magnetic flux generated from the end portions of the magnet 22 can be sufficiently interlinked with the stator core 301 and can be utilized for the torque output.

By Lm<Lf, the total quantity of the magnetic flux to be generated from the magnet 22 decreases compared to the typical example in which the length of the stator core 301 is equal to the length of the magnet 22. However, Lm<Lf corresponds to the offset of the positions of the end portions of the magnet 22 at which the magnetic flux has been unable to be sufficiently utilized for the torque output, and by Lm<Lf, the strong magnetic flux from the end portions of the magnet 22 can be sufficiently utilized for the torque output. Accordingly, even in the case of Lm<Lf, the performance of the motor 10 does not greatly decrease.

Thus, by Lm<Lf, it is possible to reduce the necessary length of the rotor 2 and achieve the downsizing of the electric motor 10 by utilizing the produced rear second space Sr2 and front second space Sf2 while securing a required performance.

If the length Lm of the magnet 22 is about 80 to 90% of the length Lf of the stator core 301, it is possible to obtain the effect without a great degradation of the performance. When the length Lm of the magnet 22 is shorter than that, the performance monotonically decreases, but the space for disposing members can be created by a quantity by which the magnet 22 is shortened.

The above-described first requirement and second requirement are common, in that the spaces (Sr1, Sf1, Sr2, Sf2) are produced by shortening the length of the constituent (the stator core 301 or the rotor 2) included in the main element 1A of the motor 10 without a great decrease in the performance of the motor 10.

In such spaces, members/sites associated with main element 1A are disposed, and thereby, it is possible to perform the downsizing while securing the performance.

[Installation of Light Source]

Next, a structure for installing the light source L connected with the lighting electric wire 43 will be described.

First, the housing Lh of the light source L is engaged with the protrusion 391 (FIG. 8) that protrudes forward from the front flange 39 of the bobbin 34, and thereby, the light source L is incorporated into the front side of the front flange 39. Thereby, it is possible to achieve the diameter reduction of the motor 10, compared to the case where the installation space for the light source L is prepared at the outside of the holder case 4, for example.

Further, the light source L is stored in the light source storage hole 84 of the base portion 81 of the insert cylinder 8. Thereby, it is possible to perform the downsizing of the motor 10 in the axial direction.

Then, the installation space given for the light source L has no room in the radial direction with respect to the size of the housing Lh of the light source L. Therefore, the light source storage hole 84 is opened also on the outer lateral surface of the base portion 81 (FIG. 3), and a cutout 49 (FIG. 3) is formed on the outer circumference portion of the front end of the holder case 4 that abuts on the base portion 81. Thereby, it is possible to dispose the inner circumference portion of the motor case 6 at the close vicinity of the outer lateral surface of the housing Lh of the light source L that is exposed across the light source storage hole 84 and the cutout 49 (FIG. 6), and to perform a further diameter reduction of the motor case 6.

[Improvement of Coil]

In the embodiment employing the non-lap winding, unlike the lap winding, it is possible to use the coils 31 to 33 that are shaped individually, and therefore, it is possible to surely increase the space factor of the coils 31 to 33, by applying a predetermined winding way to each of the coils 31 to 33. The space factor is the proportion of the cross-section area of conductors to the cross-section area of the coil.

Examples of the winding way allowing the space factor to increase include an aligned winding in which a copper wire is regularly aligned, an α winding in which both of the starting end and trailing end of the winding wire are positioned at the outside of the coil, and a bundle wire winding in which a bundle wire resulting from bundling thin element wires is used. Further, in the case of using a rectangular wire having a rectangular cross-section, the wire can be wound more densely than in the case of a round wire, resulting in the enhancement of the space factor. From a standpoint of the enhancement of the space factor, the α winding with a flat wire is most suitable.

In the embodiment, as described above, the relation between the length Lm of the magnet 22 and the length Lf of the stator core 301 is Lm<Lf, and the coils 31 to 33 are provided from one end to the other end in the length direction of the stator core 301. Therefore, the magnetic flux generated from the end portions of the magnet 22 passes through the coil ends Ce of the coils 31 to 33. In the embodiment, since the coil ends Ce are also utilized effectively, not only the space factor of the coil sides Cs but also the space factor of the coil ends Ce contribute to the performance enhancement of the motor 10.

Here, with respect to four types of an α winding with a flat wire, an aligned winding with a single round wire (hereinafter, referred to as a single wire), a thin bundle wire and a non-aligned winding with a single wire, the order in which the space factor increases, for the coil side Cs, is the order of the α winding with a flat wire, the aligned winding with a single wire, the thin bundle wire, and the non-aligned winding with a single wire.

Meanwhile, for the coil end Ce, the order is the order of the α winding with a flat wire, the thin bundle wire, the aligned winding with a single wire, and the non-aligned winding with a single wire. The reason why the order between the thin bundle wire and the aligned winding with a single wire is the reverse of the order for the coil side Cs is that leading wires of the coils 31 to 33 necessarily lap over the coil end Ce except for the α winding. If a single wire is led from between the coil end Ce and the outer circumference portion of the bobbin 34, a space equivalent to the diameter of the single wire is necessary between the coil end Ce and the outer circumference portion of the bobbin 34. By contrast, in the case of using the thin bundle wire, bundle wires are distributed in the circumferential direction. Therefore, even in the case of being the same as the single wire in total cross-section area, it is possible to fill the space between the coil end Ce and the outer circumference portion of the bobbin 34, and there are less unnecessary gaps at the peripheries of the leading wires, resulting in a high space factor.

The type of the wire to be used for the coils 31 to 33 can be arbitrarily determined, in consideration of the degree of the contribution of the coil end Ce to the torque output.

[Modification of Present Invention]

For the above-described first requirement and second requirement, the description will be added with reference to FIG. 10A to FIG. 10G.

FIG. 10A to FIG. 10G show the right side of the center in the length direction of each of the coils 31 to 33, the stator core 301 and the magnet 22.

Figure 10A:
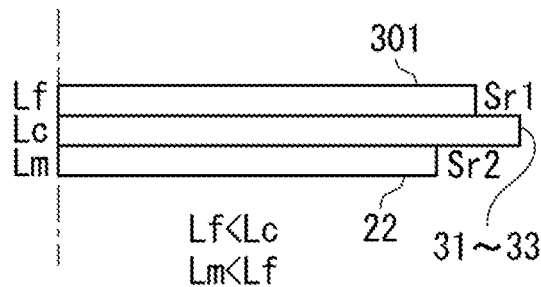
FIG. 10A to FIG. 10G are schematic views showing modifications of the present invention.

In the above embodiment shown in FIG. 10A, the order from the longest one of the length Lc of the coils 31 to 33, the length Lf of the stator core 301 and the length Lm of the magnet 22 is Lc, Lf and Lm. In the above embodiment, since Lf<Lc (first requirement) and Lm<Lf (second requirement) are satisfied, it is possible to dispose the constituent components of the motor 10 as efficiently as possible and to provide a packaging with no waste.

However, it is allowed to adopt a configuration in which only one of the first requirement and the second requirement is satisfied as in the case of modifications of the present invention shown in FIG. 10B to FIG. 10G.

Figure 10E:
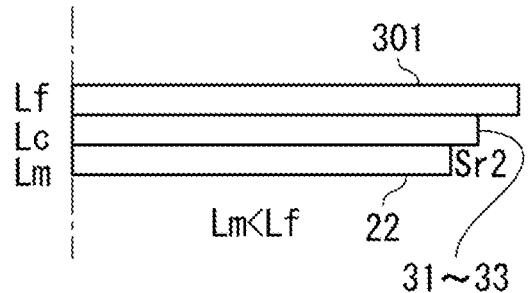
Figure 10B:
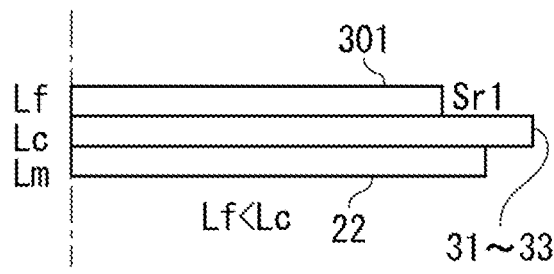
Figure 10F:
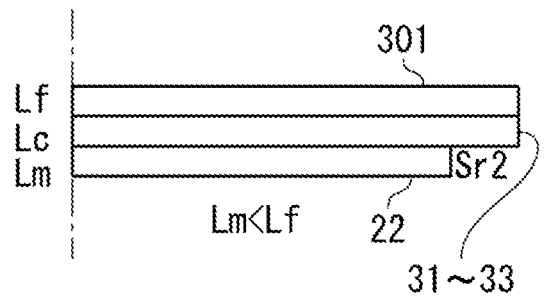
Figure 10C:
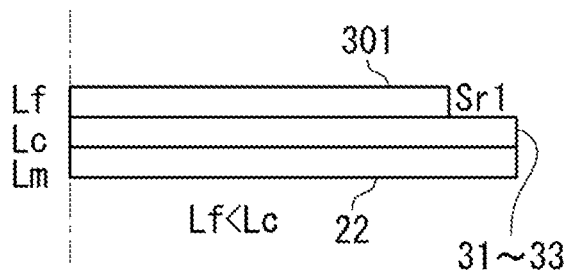
Figure 10G:
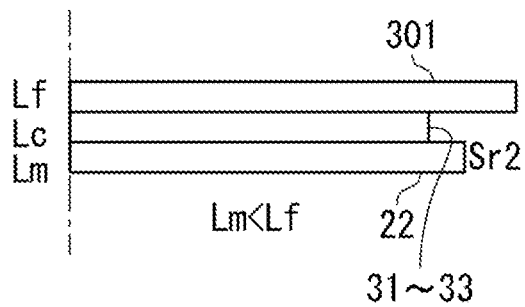
Figure 10D:
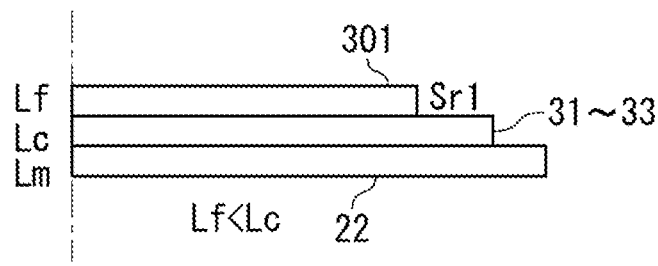

In each of the configurations shown in FIG. 10B to FIG. 10D, the first requirement (Lf<Lc) is satisfied, and therefore, the above-described function effect by the first requirement can be obtained. In FIG. 10B, the order from the longest one is Lc, Lm and Lf. FIG. 10C, in which Lc=Lm holds, differs from FIG. 10B only in this point. In FIG. 10D, the order from the longest one is Lm, Lc and Lf.

In each of the configurations shown in FIG. 10E to FIG. 10G, the second requirement (Lm<Lf) is satisfied, and therefore, the above-described function effect by the second requirement can be obtained. In FIG. 10E, the order from the longest one is Lf, Lc and Lm. FIG. 10F, in which Lf=Lc holds, differs from FIG. 10E only in this point. In FIG. 10G, the order from the longest one is Lf, Lm and Lc.

In the above embodiment, the respective axis-directional centers of the three: the magnet 22, the coils 31 to 33 and the stator core 301 coincide, but these centers do not always need to coincide. The positions of the axis-directional centers may be different among the three or between the two, depending on the sizes of the members to be disposed at the peripheries of the rotor 2 and stator 3, and the like.

Further, in the present invention, both of the rear first space Sr1 and the front first space Sf1 are not always formed at both sides in the axial direction of the stator core 301 as in the case of the above embodiment, and the first space can be formed at only one side of the front side and rear side at which the end portion of the stator core 301 recedes relative to the end portions of the coils 31 to 33. For the second space, similarly, both of the rear second space Sr2 and the front second space Sf2 are not always formed at both sides in the axial direction of the magnet 22 as in the case of the above embodiment, and the second space can be formed at only one side of the front side and rear side at which the end portion of the magnet 22 recedes relative to the end portion of the stator 3.

The electric motor in the present invention can be appropriately configured, regardless of the scheme of the drive, the materials of the constituent components and the like, as long as it is a brushless slotless type.

Further, although the coils 31 to 33 are held in the bobbin 34 in the above embodiment, the coils 31 to 33 may be directly held on the inner circumference portion of the stator core 301 without using the bobbin 34.

The electric motor in the present invention can be suitably applied to a handpiece that is used for dental treatment and technique.

Further, the electric motor in the present invention is not limited to dentistry, and can be applied to medical handpieces that are used in all medical fields.

Furthermore, the electric motor in the present invention can be used while being embedded in a machine tool.

In addition, the electric motor in the present invention can be used for various usages.

Other than the above descriptions, without departing from the spirit of the present invention, it is allowed to make a choice from the configurations described in the above embodiment, or appropriately change into another configuration.

REFERENCE SIGNS LIST 1A main element
2 rotor
3 stator
4 holder case (case body)
4A storage space
5 rear holder (end portion case)
6 motor case
7 ring screw
8 insert cylinder
9A dental handpiece
9B controller
9C hose
10 motor
21 shaft
22 magnet (permanent magnet)
22A segment
23 cover holder
25 front bearing
26 rear bearing
27 central portion
28 front end portion
29 rear end portion
30 coil unit
31 to 33 coil
34 bobbin
35 opening
36 cylinder portion
37 convex portion
38 rear flange
39 front flange
40 inner case (case)
41 water injection pipe
41H hole
42 chip air pipe
42H hole
43 lighting electric wire
43H hole
44U, 44V, 44W motor terminal
45 cooling air pipe
46 cover portion
47 holding portion
48 opening
49 cutout
50 medium pathway
51 holding portion
52 fitting portion
53 cylinder portion
81 base portion
82 connection portion
83 insertion hole
84 light source storage hole
86 claw clutch
87 engagement hole
91 tool
92 connector
93 rotation transmission mechanism
93A shaft
94 connection portion
231 cover portion
232 balance correction portion
256 waved washer
291 fitting portion
292 balance correction portion
293 bearing disposition portion
301 stator core

391 protrusion
401 abutting portion
402 engagement portion
403 section
Ce coil end
Cs coil side
L light source
Ld light emitting device
Lh housing
Sf1 front first space (first space)
Sf2 front second space (second space)
Sp gap
Sr1 rear first space (first space)
Sr2 rear second space (second space)

The invention claimed is:

1. A brushless slotless electric motor comprising:
a stator that includes a stator core and a plurality of coils, the plurality of coils being disposed at an inside of the stator core; and
a rotor that includes a shaft and a permanent magnet, the rotor being rotated around the shaft with respect to the stator, wherein:
the plurality of coils are adjacent to each other in a rotation direction of the rotor so as not to lap mutually,
$Lf<Lc$ where Lf is a length of the stator core in an axial direction and Lc is a length of one of the coils in the axial direction,
$Lm<Lf$ where Lm is a length of the permanent magnet in the axial direction,
the one of the coils has a coil side that lineally extends along an axial direction, and a coil end that is positioned at an end portion in the axial direction, and
$Lf \geq Lcs$ where Lcs is a length of the coil side in the axial direction.

2. A dental device comprising:
the electric motor according to claim 1;
a dental handpiece that is driven by the electric motor; and
a controller that performs drive control of the electric motor.

3. The electric motor according to claim 1, wherein the electric motor is an electric motor for a dental handpiece.

4. The electric motor according to claim 1, further comprising a case that stores the rotor and the stator, wherein the case comprises:
a case body including a storage space that stores the rotor and the stator, the case body having an opening formed at least at one end side in the axial direction, the opening leading to the storage space; and
an end portion case including a fitting portion that is fitted to the case body through the opening, wherein the fitting portion of the end portion case is disposed in a first space that is formed because an end portion of the stator core recedes relative to an end portion of a coil end of the coil.

5. The electric motor according to claim 1, further comprising:
a medium pathway configured such that a medium can pass through the medium pathway, the medium being suitable for being used for an application of the electric motor,
wherein the medium pathway is disposed between the adjacent coils.

6. A brushless slotless electric motor comprising:
a stator that includes a stator core and a plurality of coils, the plurality of coils being disposed at an inside of the stator core;
a rotor that includes a shaft and a permanent magnet, the rotor being rotated around the shaft with respect to the stator; and
a medium pathway configured such that a medium can pass through the medium pathway, the medium being suitable for being used for an application of the electric motor, wherein:
the plurality of coils are adjacent to each other in a rotation direction of the rotor so as not to lap mutually,
$Lf<Lc$ where Lf is a length of the stator core in an axial direction and Lc is a length of one of the coils in the axial direction,
the one of the coils has a coil side that lineally extends along the axial direction, and a coil end that is positioned at an end portion in the axial direction,
$Lf \geq Lcs$ where Lcs is a length of the coil side in the axial direction,
$Lm<Lf$ where Lm is a length of the permanent magnet in the axial direction,
the medium pathway is disposed between the adjacent coils, and
the one of the coils is wound so as to have a rectangular shape in planar view.

7. The electric motor according to claim 6, further comprising a case that stores the rotor and the stator, wherein the case comprises:
a case body including a storage space that stores the rotor and the stator, the case body having an opening formed at least at one end side in the axial direction, the opening leading to the storage space; and
an end portion case including a fitting portion that is fitted to the case body through the opening, wherein the fitting portion of the end portion case is disposed in a first space that is formed because an end portion of the stator core recedes relative to an end portion of a coil end of the coil.

8. A dental device comprising:
the electric motor according to claim 6;
a dental handpiece that is driven by the electric motor; and
a controller that performs drive control of the electric motor.

9. The electric motor according to claim 6, wherein the electric motor is an electric motor for a dental handpiece.

* * * * *

UNITED STATES PATENT AND TRADEMARK OFFICE
CERTIFICATE OF CORRECTION

PATENT NO. : 10,758,318 B2  
APPLICATION NO. : 15/500310  
DATED : September 1, 2020  
INVENTOR(S) : Akito Nakamura Page 1 of 1

It is certified that error appears in the above-identified patent and that said Letters Patent is hereby corrected as shown below:

In the Specification

Column 10, Lines 58-59, "storage hole (FIG. 3)" should read --storage hole 84 (FIG. 3)--

Signed and Sealed this  
Ninth Day of November, 2021

Drew Hirshfeld  
*Performing the Functions and Duties of the*  
*Under Secretary of Commerce for Intellectual Property and*  
*Director of the United States Patent and Trademark Office*